United States Patent
Han et al.

(10) Patent No.: US 11,275,888 B2
(45) Date of Patent: Mar. 15, 2022

(54) HYPERLINK PROCESSING METHOD AND APPARATUS

(71) Applicant: TENCENT TECHNOLOGY (SHENZHEN) COMPANY LIMITED, Shenzhen (CN)

(72) Inventors: Jialong Han, Shenzhen (CN); Yan Song, Shenzhen (CN); Shuming Shi, Shenzhen (CN); Haisong Zhang, Shenzhen (CN)

(73) Assignee: Tencent Technology (Shenzen) Company Limited, Shenzen (CN)

( * ) Notice: Subject to any disclaimer, the term of this patent is extended or adjusted under 35 U.S.C. 154(b) by 0 days.

(21) Appl. No.: 17/012,380

(22) Filed: Sep. 4, 2020

(65) Prior Publication Data

US 2021/0141993 A1   May 13, 2021

Related U.S. Application Data

(63) Continuation of application No. PCT/CN2019/092279, filed on Jun. 21, 2019.

(30) Foreign Application Priority Data

Jul. 13, 2018   (CN) .......................... 201810771876.4

(51) Int. Cl.
  *G06F 17/00*   (2019.01)
  *G06F 40/134*   (2020.01)
  (Continued)

(52) U.S. Cl.
  CPC .......... *G06F 40/134* (2020.01); *G06F 40/211* (2020.01); *G06F 40/289* (2020.01)

(58) Field of Classification Search
  CPC .... G06F 40/134; G06F 40/211; G06F 40/289; G06F 40/30
  See application file for complete search history.

(56) References Cited

U.S. PATENT DOCUMENTS

| 6,256,631 | B1 | 7/2001 | Malcolm |
| 9,305,099 | B1* | 4/2016 | Dean ..................... G06F 16/951 |

(Continued)

FOREIGN PATENT DOCUMENTS

| CN | 102541946 A | 7/2012 |
| CN | 105243091 A | 1/2016 |

(Continued)

OTHER PUBLICATIONS

Pant et al., Link Contexts in Classifier-Guided Topical Crawlers, IEEE, 2006, pp. 107-122 (Year: 2006).*

(Continued)

*Primary Examiner* — Andrew T McIntosh
(74) *Attorney, Agent, or Firm* — Crowell & Moring LLP

(57) ABSTRACT

Embodiments of this application disclose a hyperlink processing method and apparatus. The method includes: converting first context information of a first hyperlink in a first object into a first context vector; obtaining a first input vector of the first object, the first object including information on the first hyperlink pointing to a second object; obtaining a first average vector according to the first context vector and the first input vector; adjusting at least one of the first input vector, the first context vector, or a first output vector corresponding to the second object; and calculating a similarity between the first output vector and the first average vector according to an adjustment result, and outputting the first output vector as an output vector of the second object in response to the similarity being greater than or equal to a first target threshold.

18 Claims, 15 Drawing Sheets

(51) Int. Cl.
*G06F 40/211* (2020.01)
*G06F 40/289* (2020.01)

(56) References Cited

U.S. PATENT DOCUMENTS

| | | | | |
|---|---|---|---|---|
| 2005/0177805 | A1* | 8/2005 | Lynch | G06F 16/3334 |
| | | | | 715/700 |
| 2008/0288535 | A1* | 11/2008 | Zhang | G06F 16/382 |
| 2009/0235150 | A1* | 9/2009 | Berry | G06F 16/958 |
| | | | | 715/205 |
| 2018/0173699 | A1* | 6/2018 | Tacchi | G06F 16/358 |
| 2018/0349359 | A1* | 12/2018 | McCann | G06N 3/0454 |

FOREIGN PATENT DOCUMENTS

| | | |
|---|---|---|
| CN | 105930546 A | 9/2016 |
| CN | 109086348 A | 12/2018 |

OTHER PUBLICATIONS

Grangier et al., Inferring Document Similarity from Hyperlinks, ACM, 2005, pp. 359-360 (Year: 2005).*

* cited by examiner

HYPERLINK PROCESSING METHOD AND APPARATUS

CROSS-REFERENCE TO RELATED APPLICATIONS

This application is a continuation application of PCT Patent Application No. PCT/CN2019/092279, filed on Jun. 21, 2019, which claims priority to Chinese Patent Application No. 201810771876.4, entitled "HYPERLINK PROCESSING METHOD AND APPARATUS, AND STORAGE MEDIUM" and filed with the National Intellectual Property Administration, PRC on Jul. 13, 2018, wherein the content of each of the above-referenced applications is incorporated herein by reference in its entirety.

FIELD OF THE TECHNOLOGY

This application relates to the field of computers, and specifically, to a hyperlink processing method and apparatus, and a non-transitory storage medium for hyperlink processing.

BACKGROUND OF THE DISCLOSURE

Text having a hyperlink structure is referred to as a hypertext document or hypertext. With regard to a hypertext document, the hypertext document first needs to be vectorized and represented in a form of a feature vector with a fixed length.

SUMMARY

Embodiments of this application provide a hyperlink processing method and apparatus, and a non-transitory storage medium for hyperlink processing, to resolve at least a technical problem of information loss caused by converting a hyperlink object into a plain object.

An embodiment of this application provides a hyperlink processing method. The method may include converting first context information of a first hyperlink in a first object into a first context vector and obtaining a first input vector of the first object in response to the first object serving as a link source. The first object may include information on the first hyperlink pointing to a second object. The method may further include obtaining a first average vector according to the first context vector and the first input vector. The method may further include adjusting at least one of the first input vector, the first context vector, or a first output vector corresponding to the second object. The method may further include calculating a similarity between the first output vector and the first average vector according to a result of the adjusting. The method may further include outputting the first output vector as an output vector of the second object in response to the similarity between the first output vector and the first average vector being greater than or equal to a first target threshold.

An embodiment of this application provides a hyperlink processing method. The method may include obtaining a first input vector of a first object in response to the first object serving as a link source. The first input vector may at least represent the first object and content describing a second object in the first object. The first object may include information on a first hyperlink pointing to the second object. The method may further include obtaining a first output vector of the second object in response to the second object serving as a link target. The method may further include obtaining an output vector of the second object according to at least the first input vector and the first output vector.

An embodiment of this application further provides a hyperlink processing apparatus. The apparatus may include a memory operable to store program code and a processor operable to read the program code. The processor may be configured to convert first context information of a first hyperlink in a first object into a first context vector and obtain a first input vector of the first object in response to the first object serving as a link source. The first object may include information on the first hyperlink pointing to a second object. The processor may be configured to obtain a first average vector according to the first context vector and the first input vector. The processor may be configured to adjust at least one of the first input vector, the first context vector, or a first output vector corresponding to the second object. The processor may be configured to calculate a similarity between the first output vector and the first average vector according to a result of the adjustment. The processor may be configured to output the first output vector as an output vector of the second object in response to the similarity between the first output vector and the first average vector being greater than or equal to a first target threshold.

An embodiment of this application further provides a hyperlink processing apparatus. The apparatus may include a memory operable to store program code and a processor operable to read the program code. The processor may be configured to obtain a first input vector of a first object in response to the first object serving as a link source. The first input vector may at least represent the first object and content describing a second object in the first object, and the first object may include information on a first hyperlink pointing to the second object. The processor may be further configured to obtain a first output vector of the second object in response to the second object serving as a link target. The processor may be further configured to obtain an output vector of the second object according to at least the first input vector and the first output vector.

An embodiment of this application further provides an electronic device, including: a processor and a memory connected to the processor, the memory storing a computer program executable by the processor, and the processor executing the computer program to perform the foregoing method.

An embodiment of this application further provides a non-transitory machine-readable storage medium, having processor executable instructions stored thereon for causing a processor to convert first context information of a first hyperlink in a first object into a first context vector and obtain a first input vector of the first object in response to the first object serving as a link source. The first object may include information on the first hyperlink pointing to a second object. The instructions may further cause the processor to obtain a first average vector according to the first context vector and the first input vector; adjust at least one of the first input vector, the first context vector, or a first output vector corresponding to the second object; calculate a similarity between the first output vector and the first average vector according to a result of the adjustment; and output the first output vector as an output vector of the second object in response to the similarity between the first output vector and the first average vector being greater than or equal to a first target threshold.

An embodiment of this application further provides a non-transitory machine-readable storage medium, having processor executable instructions stored thereon for causing a processor to obtain a first input vector of a first object in response to the first object serving as a link source. The first input vector at least may represent the first object and content describing a second object in the first object, and the first object may include information on a first hyperlink pointing to the second object. The instructions may further cause the processor to obtain a first output vector of the second object in response to the second object serving as a link target and obtain an output vector of the second object according to at least the first input vector and the first output vector.

BRIEF DESCRIPTION OF THE DRAWINGS

The accompanying drawings described herein are used to provide further understanding of this application, and form a part of this application. Exemplary embodiments of this application and descriptions thereof are used to explain this application, and do not constitute any inappropriate limitation to this application. In the accompanying drawings.

DESCRIPTION OF EMBODIMENTS

To make a person skilled in the art understand solutions of this application better, the following clearly and completely describes the technical solutions in the embodiments of this application with reference to the accompanying drawings in the embodiments of this application. Apparently, the described embodiments are merely some but not all of the embodiments of this application. All other embodiments obtained by a person of ordinary skill in the art based on the embodiments of this application without creative efforts shall fall within the protection scope of this application.

The terms such as "first" and "second" in the specification, the claims and the accompanying drawings of this application are intended to distinguish between similar objects, but are not necessarily used for describing a specific sequence or a precedence level. It is to be understood that the data termed in such a way are interchangeable in proper circumstances, so that the embodiments of this application described herein can be implemented in orders except the order illustrated or described herein. In addition, the terms "include", "comprise" and any other variants are intended to cover the non-exclusive inclusion. For example, a process, method, system, product, or device that includes a series of steps or units is not necessarily limited to those expressly listed steps or units, but can include other steps or units not expressly listed or inherent to such a process, method, product, or device.

Currently, a processing manner of vectorizing a hypertext document is usually converting a hyper document into a plain document and then performing vectorization. However, in the foregoing manner of processing a hypertext document, a relationship between hyperlink content in the hypertext document and a source document and a relationship between the hyperlink content and a related context are ignored, resulting in information loss. For example, a context is considered as an absolute description of a target document, background information provided by a source document is lost, and consequently, an intention of citing the target document by the source document cannot be achieved by comparing the two documents.

Figure 1:
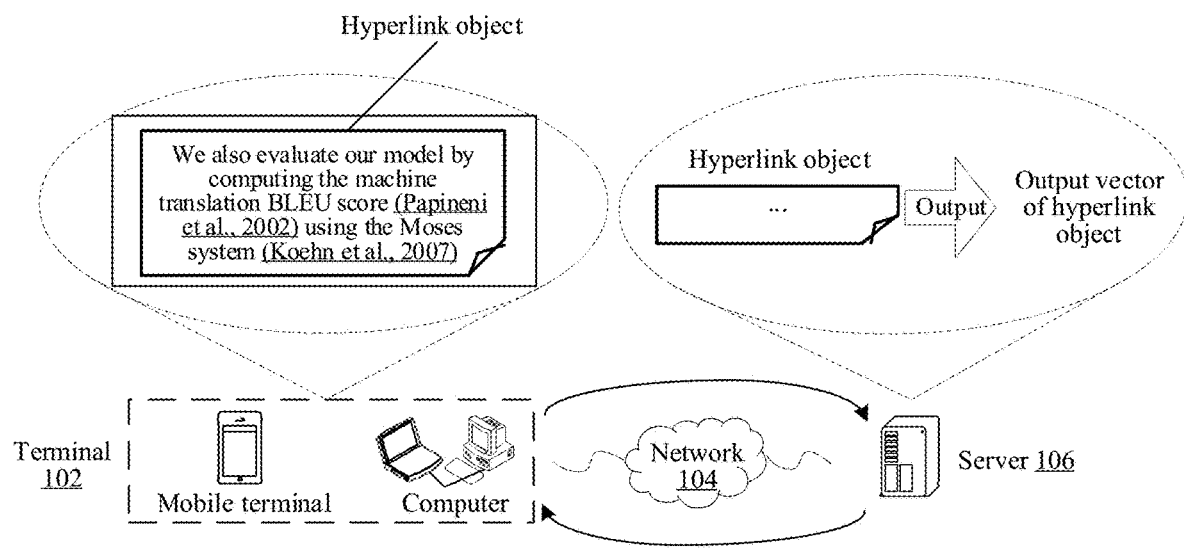
FIG. 1 is a schematic diagram of an application environment of a hyperlink processing method according to an embodiment of this application.

An embodiment of this application provides a hyperlink processing method. The hyperlink processing method may be applied to, but is not limited to, an application environment shown in FIG. 1. In a terminal 102, a hyperlink object is transmitted through a network 104 to a server 106. After receiving one or more hyperlink objects transmitted by the terminal 102, the server 106 converts, for each hyperlink object, first context information of a first hyperlink in a first object into a first context vector; obtains a first input vector of the first object in a case that the first object serves as a link source, the first object including information about the first hyperlink pointing to a second object; obtains a first average vector according to the first context vector and the first input vector; adjusts at least one of the first input vector, the first context vector, or a first output vector corresponding to the second object; and calculates a similarity between the first output vector and the first average vector according to an adjustment result, and uses and outputs the first output vector as an output vector of the second object in a case that the similarity between the first output vector and the first average vector is greater than or equal to a first target threshold. The obtained output vector of each hyperlink object may be used by a specific application when the application performs classification, recommendation, and retrieval of a hypertext document.

In this embodiment, a hyperlink is a tag that points from a specific sentence in an object to another object, for example, a uniform resource locator (URL) in a web page or a citation in an academic paper. A hyperlink object is an object including a hyperlink, and includes, but is not limited to, a hypertext document. A hypertext document (hyper document for short) is a document including a hyperlink, and includes, but is not limited to, an ordinary web page and an academic paper. With regard to a hyperlink, an object including the hyperlink is referred to as a source object (or referred to as a link source), and an object to which the hyperlink points is referred to as a target object (or referred to as a link target). With regard to an object, the object may include one or more hyperlinks to cite one or more objects or may be cited by one or more other objects.

In another embodiment, a server that performs a processing operation on a hyperlink object and a server that performs classification, recommendation, and retrieval of a hyperlink object may be the same server or different servers. No limitation is imposed in this embodiment.

In this embodiment, the foregoing terminal can include, but is not limited to, at least one of the following: a mobile phone, a tablet computer, a PC, and the like. The foregoing network may include, but is not limited to, a wireless network or a wired network, the wireless network including: Bluetooth, Wi-Fi, and other networks implementing wireless communication, and the wired network including: a local area network, a metropolitan area network, and a wide area network. The foregoing server may include, but is not limited to, at least one of the following: a PC and other devices used for providing serves. The foregoing description is merely an example, and no limitation is imposed in this embodiment.

Figure 2:
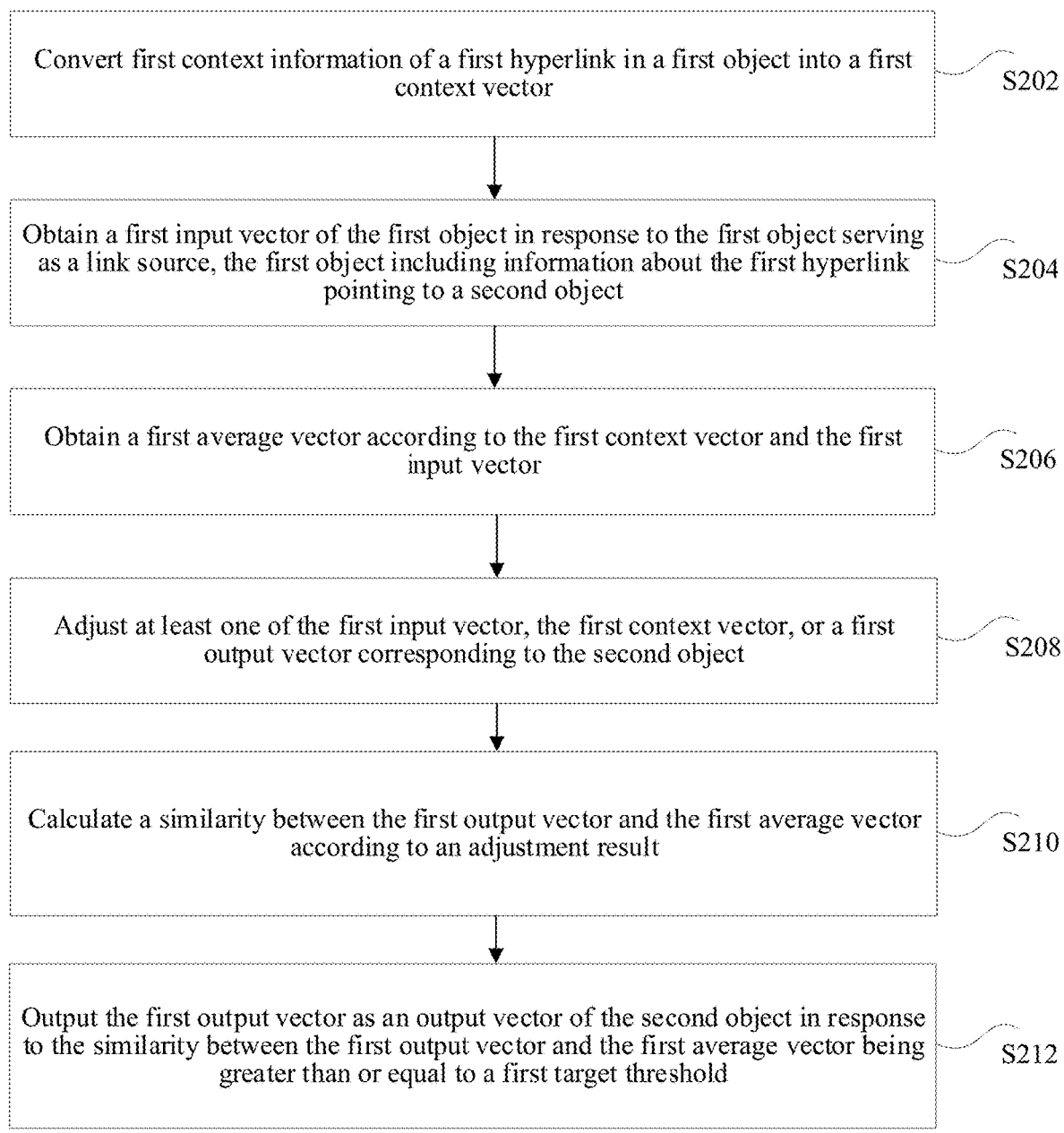
FIG. 2 is a schematic flowchart of a hyperlink processing method according to an embodiment of this application.

According to an embodiment of this application, as shown in FIG. 2, a hyperlink processing method, executable by a computing device, may include the following steps:

Step S202: Convert first context information of a first hyperlink in a first object into a first context vector.

Step S204: Obtain a first input vector of the first object in a case that the first object serves as a link source, the first object including information about the first hyperlink pointing to a second object.

Step S206: Obtain a first average vector according to the first context vector and the first input vector.

Step S208: Adjust at least one of the first input vector, the first context vector, or a first output vector corresponding to the second object.

Step S210: Calculate a similarity between the first output vector and the first average vector according to an adjustment result.

Step S212: Use the first output vector as an output vector of the second object and output the output vector of the second object in a case that the similarity between the first output vector and the first average vector is greater than or equal to a first target threshold.

In an embodiment of this application, the foregoing hyperlink processing method may be applied to, but is not limited to, a process such as classification, recommendation, or retrieval of a specific object. For example, the foregoing hyperlink processing method may be applied to citation recommendation for an academic paper, similar document and keyword retrieval, or hyper document (that is, a hypertext document) classification.

Descriptions are provided below by using citation recommendation for an academic paper as an example. First, a server obtains a paper set of existing papers, for each hyperlink in the paper set, converts context information of a specific hyperlink of a first paper (a first object, that is, a link source of the hyperlink) into a context vector, and obtains an input vector of the first paper when the first paper serves as a link source, the first paper including information about the hyperlink pointing to a second paper (a second object, that is, a link target of the hyperlink); obtains a first average vector according to the context vector and the input vector; adjusts at least one of the first average vector, the first input vector, or an output vector corresponding to the second paper; and calculates a similarity between the output vector and the first average vector according to an adjustment result, and uses and outputs the output vector as an output vector of the second paper in a case that the similarity between the output vector and the first average vector is greater than or equal to a target threshold. After an output vector (and an input vector) of each existing paper is obtained, the output vector (and the input vector) of the existing paper may be stored on the server.

In the foregoing solution, when a user drafts an academic paper, citation recommendation may be performed by using a target APP on a terminal, and the target APP may exchange data with the server storing the foregoing output vector and input vector. For example, a context is inputted at a specified input position of the target APP, the target APP transmits the context to the server, and the server scores, according to output vectors of existing papers and the context, the existing papers by using a target formula (discussed below in detail), obtains scores of the existing papers, determines, according to the obtained scores, one or more existing papers that can be cited by the context, and transmits one or more hyperlinks pointing to the determined one or more existing papers to the terminal, to help the user to cite the existing papers. It may be understood that, the one or more hyperlinks may be transmitted in a manner of being embedded into the context, or may be transmitted directly in a manner of being displayed in combination with a digest, and this is not limited in this embodiment of this application.

In an embodiment of this application, a server that processes the existing papers, a server that stores a processing result, a server that receives the context, and a server that scores the existing papers may be the same or different, and this is not limited in this embodiment.

In this embodiment, in the foregoing hyperlink processing method, a combination of the input vector of the hyperlink object in a case that the hyperlink object serves as the link source and the corresponding context vector is compared with the output vector when the hyperlink object serves as the target object for a similarity, so that the output vector can sufficiently include complete information about the hyperlink object, to avoid losing key information, thereby achieving a technical effect of improving information completeness.

Figure 3:
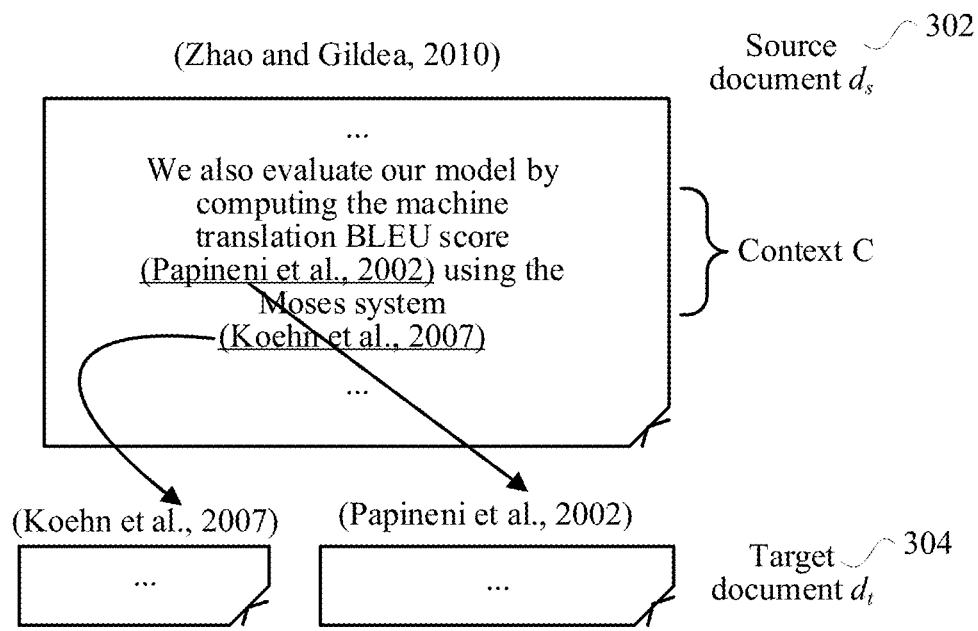
FIG. 3 is a schematic diagram of a hypertext document and a hyperlink according to an embodiment of this application.

The hyperlink and the hyperlink object are described by using a hyper document as an example. As shown in FIG. 3, in a context formed by a sentence ("We also evaluate our model by computing the machine translation BLEU score (Papineni et al., 2002) using the Moses system (Koehn et al., 2007)"), a source document (Zhao and Gildea, 2010, $d_s$ for short) (302) points to a target document ((Papineni et al., 2002) and (Koehn et al., 2007), $d_t$ for short) (304) by using a hyperlink. The foregoing hyperlink may be recorded as $<d_s,C,d_t>$.

In this embodiment, vectorized representation may be performed on a hyperlink object. The vectorized representation is a manner of representing an abstract object (for example, a word, a document, or a user) as a feature vector with a fixed length. An object represented in a vectorized manner may be used by a specific application for subsequent classification, recommendation, or retrieval of an original object. Different from a method of manually extracting each dimension of a feature vector in conventional feature engineering, a vectorized representation method enables a whole feature vector to be obtained automatically.

The vectorized representation is described below by using a document as an example. There may be a plurality of manners of vectorizing a plain document (that is, a document without a hyperlink), including, but not limited to, word2vec and doc2vec. The two manners are separately described herein.

Word2vec (w2v for short): For each word in a document, w2v obtains one IN vector and one OUT vector through learning. A word vector learning technology includes two variants, namely, Continuous Bag of Words (CBOW) and skip-gram: In the CBOW method, IN vectors of context words are averaged, and an OUT vector of a current word is predicted accordingly. In the skip-gram method, an OUT vector of a context word is predicted by using an IN vector of a current word. Because a relationship between words in a plain document is mutual (a word a is a context word of a word b, and the word b is also a context word of the word a), an IN vector and an OUT vector of a specific word that are obtained through learning are similar.

Doc2vec (d2v for short): D2v is an extension based on w2v, and also includes two variants: Distributed Memory Model of Paragraph Vectors (PV-DM) and Distributed Bag of Words version of Paragraph Vector (PV-DBOW). A PV-DM method is similar to CBOW, and differs from CBOW only in that an IN vector of a current document is also included in averaging as a special context word vector. Similarly, in the PV-DBOW method, an IN vector of a current document and a network structure similar to that of skip-gram are used for predicting an OUT vector of a word in the document.

Two manners (citation-as-word and context-as-content) of vectorizing a hyper document are described below separately. The manner of citation-as-word is converting a hyper document into a plain document and correspondingly invoking w2v to obtain a document vector, and the manner of context-as-content is converting a hyper document into a plain document and correspondingly invoking d2v to obtain a document vector.

Figure 4:
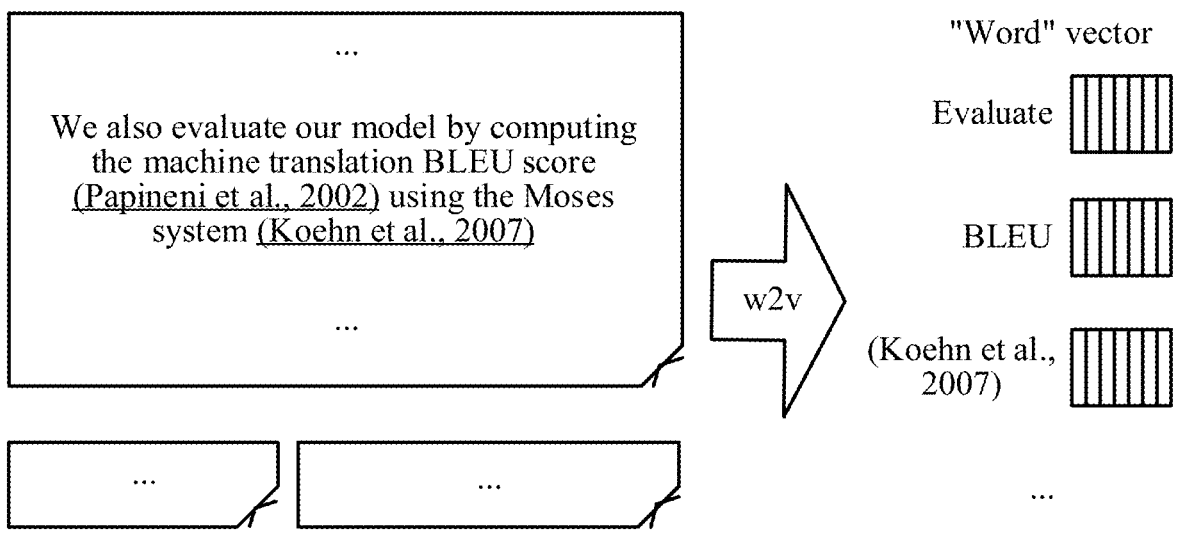
FIG. 4 is a schematic diagram of another hyperlink processing method according to an embodiment of this application.

Citation-as-word (citation information in a source document is processed as a word in the source document): A document ID (the citation information in the source document) generated by citing a target document in the source document is considered as a special word. Vectors of all "words" in a hyper document set (a combination of a plurality of hyper documents) including a special word are obtained by using w2v, and a "word" vector of the special word is considered as a vector of a corresponding hyper document, as shown in FIG. 4. In the foregoing source document $d_s$, (Koehn et al., 2007) is citation information, that is, a special word.

Figure 5:
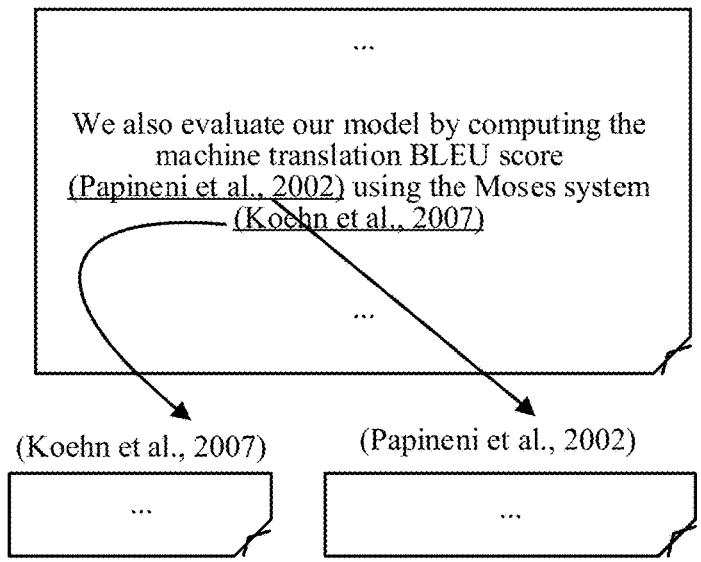
FIG. 5 is a schematic diagram of another hyperlink processing method according to an embodiment of this application.
Figure 5:
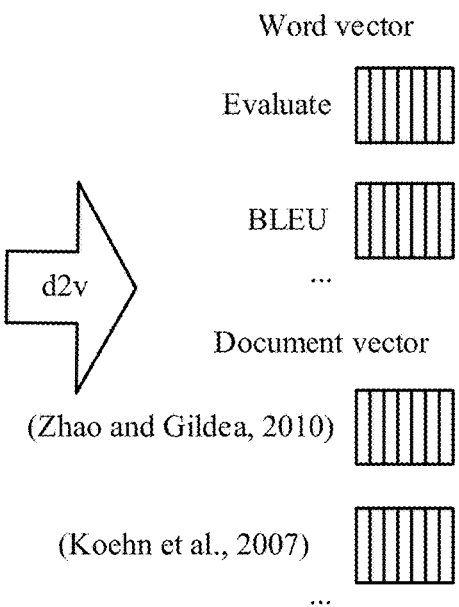

Context-as-content (a context of a hyperlink in a source document is processed as content in a target document): First, all hyperlinks in the source document are deleted, contexts C of the hyperlinks are then added to the target document as content of the target document, and further, the converted plain document is inputted into d2v, to obtain a document vector, as shown in FIG. 5. The method is referred to as d2v-cac. Correspondingly, a method of deleting a hyperlink to input a target document into d2v without supplementing a context to the target document is referred to as d2v-nc.

The hyper document vectorization method in the related art may be used for citation recommendation for an academic paper, but a manner commonly adopted is essentially a citation-as-word method, and can only be used for this task in the art. The vectorization method may alternatively be used for obtaining a node vector in an undirected graph, but in an adopted manner, only a link structure between hyper documents is processed without considering text content information.

Figure 6:
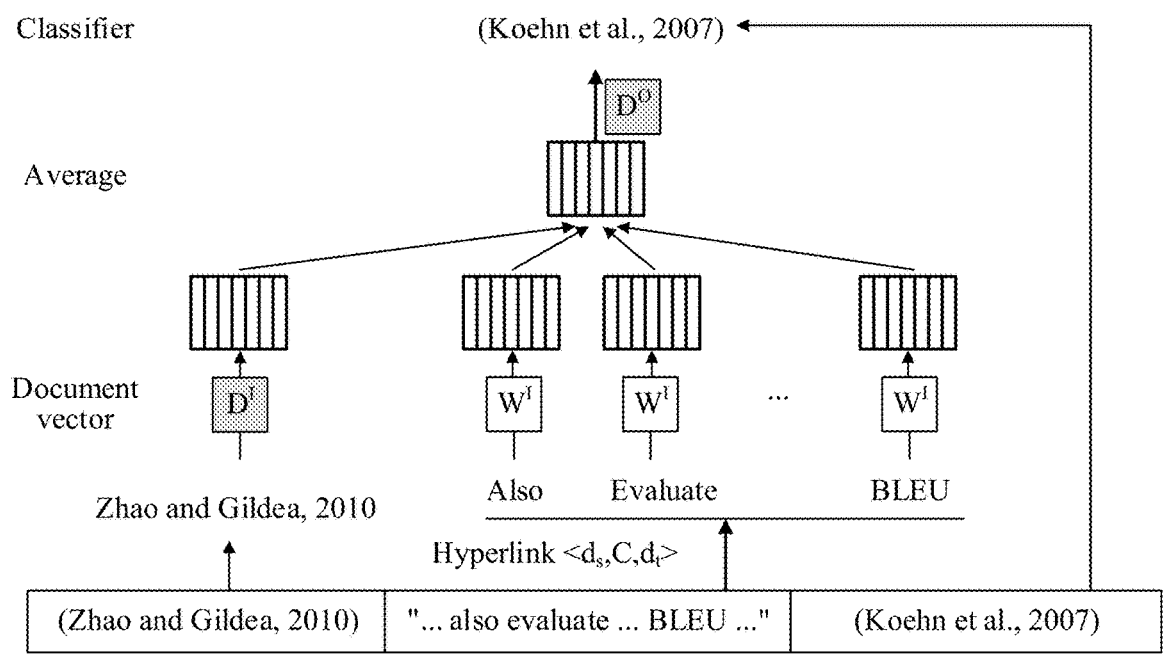
FIG. 6 is a schematic diagram of another hyperlink processing method according to an embodiment of this application.

With reference to FIG. 6, compared with the foregoing two manners, with regard to the foregoing hyperlink $<d_s,C,d_t>$, according to the hyperlink processing method provided in this embodiment of this application, the following may be obtained:

an IN vector $d_s^I$ of a source document $d_s$ corresponding to the hyperlink (functioning the same as the foregoing first input vector, the IN vector may be an initial input vector of the source document or an intermediate input vector of the source document obtained in a training process);

an IN vector $w^I$ corresponding to a word in a context C (C in this example is a context obtained after the hyperlink is removed from a sentence including the hyperlink) of the hyperlink; and an OUT vector of a target document $d_t$ corresponding to the hyperlink (functioning the same as the foregoing first output vector, the OUT vector may be an initial output vector of the target document or an intermediate output vector of the target document in a training process) and an OUT vector of another hyper document.

After $d_s^I$, $w^I$, and $d_t^O$ are obtained, $d_s^I$, $w^I$, and $d_t^O$ may be inputted into a second target model (a network structure is shown in FIG. 6). With regard to the hyperlink $<d_s,C,d_t>$, network input and output layers process the hyperlink as follows:

Input layer: An IN vector $d_s^I$ of $d_s$ and an IN vector $w^I$ of each word w in C are averaged by using a formula (1), to obtain a vector x:

$$x = \frac{1}{1+|C|}\left(d_s^I + \sum_{w \in C} w^I\right) \quad (1)$$

Output layer: OUT vectors $d^O$ of all hyper documents D form a softmax classifier, to match a suitable hyper document for x, and a basis of recommendation is:

$$P(d_t / d_s, C) = \frac{\exp(x^T d_t^O)}{\sum_{d \in D} \exp(x^T d_t^O)} \quad (2)$$

The foregoing input layer structure is similar to a PV-DM model and differs from the PV-DM model only in that the output layer is changed from a softmax word classifier to a document classifier.

With regard to all hyperlinks $C=\{<d_s,C,d_t>\}$, the following target function:

$$\max_{D^I,D^O,W^I} \sum_{<d_s,C,d_t>\in c} \log P(d_t/d_s, C)$$

may be optimized by using an optimization algorithm such as gradient descent, where $D^I$ is a matrix constituted by IN vectors of all hyper documents in a hyper document set, $D^O$ is a matrix constituted by OUT vectors of all the hyper documents in the hyper document set, and $W^I$ is a matrix constituted by IN vectors of all words in the hyper document set.

In a training stage of a network, to make a learned hyper document vector be content-sensitive, a document vector is pre-trained by using a word in a document. In this example, the foregoing target function is optimized in a manner similar to PV-DM, first several rounds (for example, 5 rounds) of PV-DM iterations are performed on a network shown in FIG. 6, and further, the foregoing target function is used for several rounds of iterative optimization.

Similar to w2v/d2v, to accelerate a training process, in this example, the following formula (3) of negative sampling is used to approximate log $P(d_t/d_s,C)$:

$$\log P(d_t/d_s, C) = \log\sigma(x^T d_t^O) + \sum_{i=1}^{n} E_{d_i \sim P_N(d)} \log\sigma(-x^T d_i^O) \quad (3)$$

where n is a quantity of samples, and $P_N(d)$ is average distribution over all document sets, and log $P(d_t/d_s,C)$ in the foregoing target function is replaced with log $P(d_t/d_s,C)$ after approximation.

In an embodiment of this application, in a training step following FIG. 6, document and word vectors may be learned of by using a retraining/fine-tuning method (also referred to as retro-fitting) or by linearly combining two targets and using a joint optimization or multi-target learning method.

In an embodiment of this application, in negative sampling of the step, a learning process may alternatively be simplified and accelerated by using a hierarchical softmax method.

In an embodiment of this application, in $P_N(d)$, a probability of each document may be chosen to be proportional to a quantity of times that the document is cited (a non-0 probability is obtained by using the smoothing technology for a document that is cited 0 times). A method similar to sub-sampling of w2v/d2v may be used to prevent a highly cited document from being sampled too many times. In an embodiment of this application, a learning process may alternatively be simplified and accelerated by using a hierarchical softmax method.

For example, in a database with 1000 documents, when hyperlink processing needs to be performed on the 1000 documents in the database, the documents are processed one by one. For example, a document No. 101 cites a document No. 108, where ds represents a vector of the document No. 101, and the vector may be pre-stored. When the document No. 101 is processed, the vector of the document No. 101 is first obtained, a part including a hyperlink in the document No. 101 is then located, and context information of the hyperlink and a corresponding context vector (equivalent to a vector C) are obtained. In addition, a target document to which the hyperlink points, that is, a vector corresponding to the document No. 108 (equivalent to an output vector dt), is further obtained. After the vectors are obtained, the vectors ds and C are averaged, to obtain an average vector (assumed to be da). Subsequently, the average vector da, the output vector dt, and a to-be-optimized target function are put into an optimization algorithm such as gradient descent, and the algorithm may provide a suggestion about how to adjust ds, C, and dt to increase the target function. The foregoing process is repeated a plurality of times until the target function is hardly increased. When the target function is no longer increased, the optimization algorithm outputs IN and OUT vectors of all documents.

In this example, the hyperlink processing method may be evaluated by using a plurality of criteria, and the foregoing criteria may include, but are not limited to: context-sensitivity, content-sensitivity, new document-friendliness, and context intention-sensitivity. The four criteria are specifically described as follows:

Context-sensitivity: A hyper document vector of a hyper document is necessarily affected by a hyperlink context in another hyper document pointing thereto (that is, in another hyper document pointing to a current document, what context is used by the another hyper document to describe the current document).

Content-sensitivity: A hyper document vector is affected by content thereof.

New document-friendliness: For a newly generated hyper document such as a new web page or a new paper, it is likely that no other document points to the newly generated hyper document. For such a new document, in a hyper document vectorization method, a hyper document vector is also to be generated for the new document.

Context intention-sensitivity: Different from the foregoing three criteria for a hyper document vector, this criterion is directed to a word vector in a hyper document vectorization process. In a good hyper document vectorization method, an intention of a hyperlink (for example, referring to a target document in a broad sense or agreeing/opposing an opinion or a method in a target document) is to be expressed in a vector corresponding to a context word.

The foregoing w2v, d2v-nc, and d2v-cac all have disadvantages in one or more of the foregoing evaluation criteria, and are described below one by one.

First, the w2v method is not content-sensitive. As shown in FIG. 4, although ". . . computing the machine translation BLEU score . . . " is content in a source document (Zhao and Gildea, 2010), after conversion, the content is not related to this document, that is, the word vector does not represent a document ID (Zhao and Gildea, 2010). In addition, for a newly published paper that is not cited, in the w2v method, no special word is generated for a document ID of the paper, and no "word" vector is generated for the paper either. Therefore, w2v is not new document-friendly either.

Second, the d2v-nc method is not context-sensitive because a hyperlink is removed without supplementing a context to a target document, and a relationship between the target document and the context is lost.

Finally, none of the foregoing three methods (the w2v method, the d2v-cac method, and the d2v-nc method) is context intention-sensitive. When a hyperlink is modeled, three elements of the hyperlink, namely, a source document, a context, and a target document, are simplified by the three methods into a relationship between the context and the target document. As a result, the context is considered as an absolute description of the target document, background information provided by the source document is lost, and consequently, an intention of referencing the target document by the source document cannot be achieved by comparing the two documents.

The hyperlink processing method provided in this example can satisfy all the foregoing four criteria, namely, context-sensitivity, content-sensitivity, new document-friendliness, and context intention-sensitivity. Descriptions are provided below by using a hyper document shown in FIG. 7 as an example.

Context-sensitivity: When the foregoing target function is optimized, an OUT vector of (Papineni et al., 2002) is affected by an IN vector of a context word (for example, "BLEU").

Content-sensitivity: Through pre-training of a PV-DM model, an IN vector of each hyper document is affected by a word in the hyper document.

New document-friendliness: If a hyper document is not pointed to by any hyperlink, at worst, an IN vector may be obtained for the hyper document by depending on content of the hyper document. In addition, when a quantity n of negative examples of negative sampling is large enough, an OUT vector can also be generated for the current document.

Context intention-sensitivity: The foregoing target function enables respective vectors of a pair of a source document and a target document and a context word to improve each other. Under the background of (Zhao and Gildea, 2010), that is, a machine translation source document, a context word vector captures an intention of "using a method/technology in the target document" implicitly indicated by the two words "evaluate by", so that a better prediction (Papineni et al., 2002) of a hyperlink is a target document about a BLEU evaluation method in machine translation. Moreover, after the network in FIG. 4 is trained in a plurality of documents similar to (Zhao and Gildea, 2010)/(Papineni et al., 2002) (a source document/a target document), a semantic meaning, such as "using a method/technology in the target document", can also be better captured.

Table 1 shows analysis results of analyzing w2v, d2v-nc, d2v-cac, and h-d2v with reference to the foregoing two criteria.

TABLE 1

| | Is a task affected | | Is it satisfied by the method | | | |
|---|---|---|---|---|---|---|
| Criterion | Classification | Citation recommendation | W2v | D2v-nc | D2v-cac | H-d2v |
| Context-sensitivity | ✓ | ✓ | ✓ | — | ✓ | ✓ |
| Content-sensitivity | ✓ | ✓ | — | ✓ | ✓ | ✓ |
| New document-friendliness | ✓ | ✓ | — | ✓ | ✓ | ✓ |
| Context intention-sensitivity | — | ✓ | — | — | — | ✓ |

It can be known from Table 1 that in the hyperlink processing method (h-d2v) provided in this example, three elements (a source document, a context, and a target document) of a hyperlink are directly modeled to avoid losing key information. In such a modeling manner, h-d2v can satisfy all of the four criteria.

For each object, there may be one input vector and one input vector that correspond to the object. The input vector is a vector corresponding to the object when the object serves as a link source, and information included in the input vector may be used for representing the object and a target object cited by the object. The output vector is a vector corresponding to the object when the object serves as a link target, and information included in the output vector may be used for representing a source object that cites the object and content used for describing the object in the source object that cites the object.

In this embodiment, before first context information of a first hyperlink in a first object is converted into a first context vector, an initial input vector and an initial output vector of each hyperlink object may be obtained first.

In this embodiment, the initial input vector of each hyperlink object may be a document vector of each hyperlink object obtained by inputting a hyperlink object set into a first target model. The first target model is configured to vectorize each hyperlink object in the hyperlink object set, to obtain a document vector of each hyperlink object, and the obtained document vector of each hyperlink object is used as the initial input vector of the hyperlink object. An input vector of each word may be further obtained by using the first target model. It may be understood that, the initial output vector of the hyperlink object may be randomly generated by using a target algorithm.

In this embodiment, before the hyperlink object set is inputted into the first target model, the hyperlink object set may be processed, and all hyperlink objects in the hyperlink object set are converted into plain objects. A conversion manner may be included, but is not limited to: directly deleting a hyperlink, deleting a hyperlink in a source object and adding a context of the hyperlink to a target object as content of the target object, and using citation information corresponding to a hyperlink as a special word.

In this embodiment, before or after all the hyperlink objects in the hyperlink object set are converted into plain objects, a pre-processing operation, such as word segmentation or part of speech annotation, may be performed on the hyperlink objects. A specific pre-processing manner may be performed according to requirements, and this is not limited in this application.

In this embodiment, in the process of inputting the hyperlink object set into the first target model to obtain the document vector of the hyperlink object, an IN vector corresponding to each word (or an IN vector and an OUT vector corresponding to each word) in the hyperlink object set may be further obtained.

In this embodiment, the context including the foregoing hyperlink may be specified content including the hyperlink in the hyperlink object. The context including the hyperlink may be obtained in various manners. For example, the context including the hyperlink may be obtained in a manner of setting a quantity of words included by the context (for example, the context including the foregoing hyperlink may be content included in from 50 words in front of the hyperlink to 50 words following the hyperlink in the hyperlink object). Alternatively, the context including the hyperlink may be obtained in a manner of setting a quantity of sentences included by the context (for example, the context including the foregoing hyperlink is a sentence including the hyperlink in the hyperlink object or content included in from one sentence in front of a sentence including the hyperlink to one sentence following the sentence including the hyperlink in the hyperlink object). The first context may be a context obtained by removing the hyperlink from the context including the hyperlink.

In this embodiment, a document vector of each hyperlink object and an input vector of each word may be obtained by using the first target model.

In an embodiment of this application, the obtaining a first average vector according to the first context vector and the first input vector may include: averaging the first input vector and an input vector corresponding to each word in a first context, the first context being a context obtained after the first hyperlink is removed from a context including the first hyperlink in the first object.

In this embodiment, the first average vector may be obtained according to the first input vector and the first context vector. A manner of obtaining the first average vector may be: averaging the first input vector and an input vector corresponding to each word in a first context, to obtain the first average vector. A vector length of the first input vector is the same as a length of an input vector of a word in the context, and the first average vector may be obtained by averaging values of elements at respective positions in input vectors corresponding to words in the first input vector and the first context.

For example, there are 5 words in the first context, a vector length of the first input vector is the same as a length of an input vector of a word, both including 6 elements, values of elements at respective positions of the first input vector and values of elements at corresponding positions on input vectors of 5 words are respectively averaged (for example, a value of the first element of the first input vector and a value of the first element of each word in the 5 words are averaged and so on), to obtain the first average vector.

In this embodiment, the first input vector may be an initial input vector of the first object or may be an intermediate input vector of the first object obtained in a process of obtaining an input vector and an output vector of each hyperlink object in an iteration manner. The first output vector may be an initial output vector of the second object or may be an intermediate output vector of the second object obtained in a process of obtaining an input vector and an output vector of each hyperlink object in an iteration manner.

In this embodiment, for one hyperlink, a similarity between an output vector of the target object and an average vector (an average vector of the input vector of the source object and the context vector describing the target object in the source object) is made through adjustment greater than or equal to the first target threshold, so that the output vector of the target object can more accurately represent the source object (the input vector of the source object) citing the target object and information (the context vector of the hyperlink) used for describing the target object in the source object citing the target object, and the input vector of the source object can more accurately represent the content (the input vector of the source object) thereof and the cited target object (the output vector of the target object).

In this embodiment, the foregoing adjustment process may be inputting word vectors corresponding to respective words in the first input vector and the first context into a second target model, obtaining, by the second target model, the first average vector, comparing the first average vector with the first output vector of the second object, and increasing the similarity between the first average vector and the first output vector by adjusting at least one of the first input vector, the first context vector, and the first output vector.

In this embodiment, the input of the second target model may include: an initial input vector and an initial output vector of each hyperlink object, and an initial input vector of each word in the hyperlink object set. The second target model adjusts an input vector and an output vector of each hyper document and an input vector of each word in the hyperlink object set, to optimize a target function by using an optimization algorithm. Variables of the target function are the input vector and the output vector of the hyperlink object and the input vector of each word in the hyperlink object set. The target function is used for obtaining an input vector and an output vector of each hyperlink object and an input vector of each word in the hyperlink object set that satisfy the following condition: making a sum of similarities between average vectors of input vectors of source objects of respective hyperlinks in all hyperlinks included in the hyperlink object set and input vectors corresponding to words in contexts including the hyperlinks and output vectors of target objects of the hyperlinks the maximum.

After the first output vector is used and outputted as the output vector of the second object, the first input vector and the first output vector are updated to an adjusted first input vector and an adjusted first output vector.

In this embodiment, after the first output vector is used and outputted as the output vector of the second object, the outputted output vector may be used for updating an output vector stored last time. Alternatively, the first input vector may be used and outputted as the input vector of the first object, and the input vector may be used to update the first input vector. Alternatively, an input vector of each word in the adjusted average vector may be used and outputted as an input vector of the corresponding word, and the outputted input vector of the word may be used to update the input vector of the word.

After the first input vector and the first output vector are updated to the adjusted first input vector and the adjusted first output vector, other hyperlinks in all objects may be located, and the located hyperlinks may be used as a first hyperlink. A source object of the hyperlink may be used as a first object, and a target object of the hyperlink may be used as a second object. The foregoing steps are repeatedly performed until hyperlinks included in all the objects are all processed.

In this embodiment, after all the located hyperlinks are processed, the steps of locating all the hyperlinks and processing the located hyperlinks may be repeatedly performed, to obtain more accurate vectorized representation of a hyperlink object.

In this embodiment, all the foregoing objects may be all objects in the hyperlink object set. With regard to the hyperlinks in all the objects, all the hyperlinks included in the hyperlink object set may be obtained in a manner of obtaining a hyperlink included in each object in the hyperlink object set (the hyperlink may be represented in a manner of $<d_s,C,d_t>$).

Figure 7:
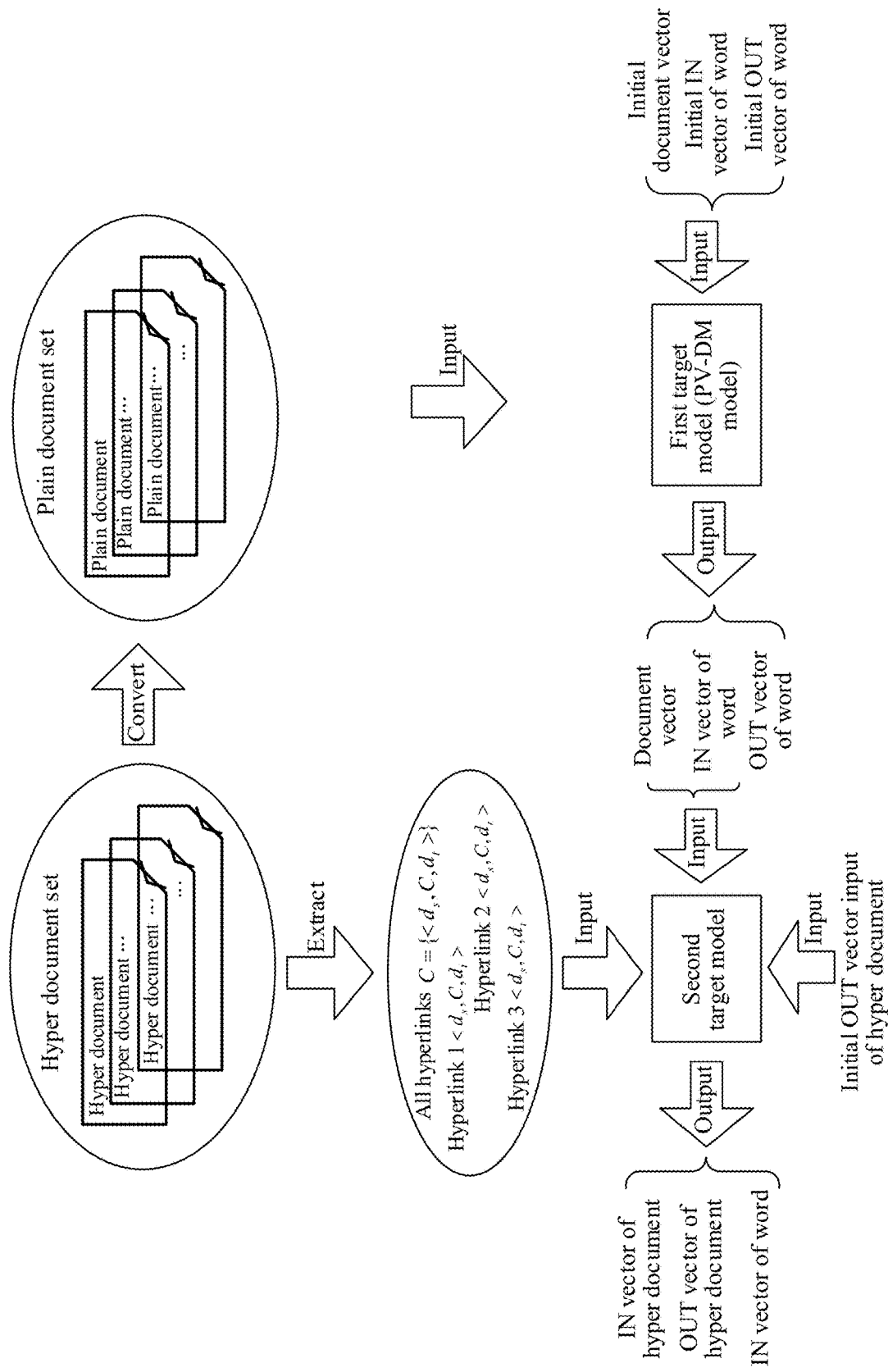
FIG. 7 is a schematic diagram of a network structure of h-d2v according to an embodiment of this application.

The hyperlink processing method is described below with reference to a specific example. In this example, the hyperlink object set is a hyper document set, and the hyperlink document is a hyper document. As shown in FIG. 7, the hyperlink processing method includes the following steps:

Convert each hyper document in a hyper document set into a plain document.

Process, by using a first target model (for example, a PV-DM model), an initial document vector of each hyper document (the converted plain document) in the hyper document set and an initial IN vector and an initial OUT vector of each word in the hyper document set, to obtain a document vector of each hyper document in the hyper document set and an IN vector and an OUT vector of each word in the hyper document set.

Process, by using a second target model, an initial IN vector (which is the document vector of each hyper document obtained by using the first target model) and an initial OUT vector of each hyper document in the hyper document set and the IN vector (the IN vector of each word in the hyper document set obtained by using the first target model) of each word in the hyper document set, to obtain an IN vector (functioning the same as the foregoing target input vector) and an output vector (functioning the same as the foregoing target output vector) of each hyper document in the hyper document set and an IN vector of each word in the hyper document set.

The hyperlink processing method in this example is described below in detail.

With regard to a hyper document set including 100 hyper documents, the hyperlink processing method may include two stages: a pre-training stage and a training stage. In the pre-training stage, an IN vector and an OUT vector of each word in the hyper document set and a document vector of each hyper document are obtained by using the first target model. In the training stage, an IN vector and an OUT vector of each hyper document and an IN vector of each word in the hyper document set are obtained by using the second target model.

In the pre-training stage, the 100 hyper documents in the hyper document set are first converted into 100 plain documents, and a conversion manner may be d2v-nc as stated above: deleting a hyperlink from a hyper document without supplementing a context to the target document. The initial IN vector and the initial OUT vector of each word in the hyper document set and the initial document vector of each hyper document are then obtained by using a target algorithm. The 100 plain documents after conversion, the initial IN vector and the initial OUT vector of each word, and the initial document vector of each hyper document are inputted into the PV-DM model, to obtain the IN vector and the OUT vector of each word in the hyper document set and the document vector of each hyper document. The foregoing document vector of each hyper document may be used as an initial IN vector (which may be one type of the foregoing first input vectors) of a hyper document in the second target model.

In the training stage, the method in which the second target model processes a hyper document may be referred to as hyperdoc2vec (h-d2v for short). In the method, three elements (a source document, a context, and a target document) of a hyperlink are directly modeled to avoid loss of key information. In h-d2v, each hyper document is represented by using two vectors (an IN vector and an OUT vector). An IN vector $d^I$ of a hyper document d stores information about the hyper document d, for example, content of d and what document is cited by d, when the hyper document d serves as a source document. An OUT vector $d^O$ of d stores information about d, for example, what document cites d, and how a document that cites d describes d, when d serves as a source document. A hyper document d is represented by using two vectors, namely, $d^I$ and $d^O$, so that the hyper document and a hyperlink may be naturally and directly modeled in a vectorized manner.

Input of the second target model is: the initial IN vector and the initial OUT vector of each hyper document in the hyper document set and the IN vector of each word in the hyper document set. The initial IN vector of each hyper document may be the document vector of each hyper document obtained by using the first target model, the initial OUT vector of each hyper document may be an OUT vector of each hyper document randomly generated by using the target algorithm, and the IN vector of each word in the hyper document set may be the IN vector of each word in the hyper document set obtained by using the first target model.

A time of generating an initial OUT vector may be any time before the initial IN vector and the initial OUT vector of each hyper document and the IN vector of each word in the hyper document set are inputted into the second target model. For example, before the first target model is used, the initial IN vector and the initial OUT vector of each word in the hyper document set and the initial document vector of each hyper document are generated together. Alternatively, the time may be after the IN vector and the OUT vector of each word in the hyper document set and the document vector of each hyper document are obtained by using the first target model. A specific time of obtaining the initial OUT vector is not limited in this example.

In the training stage, all hyperlinks $C=\{<d_s,C,d_t>\}$ in the hyper document set may be obtained, an operation of obtaining the hyperlinks may be performed before the second target model is used or after the second target model is used. For example, before the second target model is used, all the hyperlinks may be obtained by scanning all the hyper documents in the hyper document set. Alternatively, when the second target model process is used, all the hyperlinks may be obtained by sequentially scanning all the hyper documents. A specific obtaining manner and a specific obtaining time are not limited in this example.

In this example, through the foregoing pre-training stage and training stage, the IN vector and the OUT vector of each hyper document in the hyper document set may be obtained.

In this embodiment, after the first output vector is used and outputted as the output vector of the second object, the obtained output vector (and input vector) may be used in a plurality of scenarios, and the foregoing scenarios may include, but are not limited to, the following.

Hyper document classification: For a group of annotated hyper documents (that is, {<document, tag>}), a classification algorithm (for example, the SVM) is used, and a classifier is trained by using training data {<d,l>} including a hyper document vector and an annotation and is used for annotating an unknown hyper document, to predict a type of a hyper document. The document vector used in the prediction process may be an IN vector or an OUT vector of the hyper document or a combination of the IN vector and the OUT vector of the hyper document.

Similar document and keyword retrieval: The obtained hyper document vector (the input vector and the output vector) may be used to calculate a similarity between documents (in a general cosine angle method, an IN vector or an OUT vector of a hyper document or a combination of the two is used) and a similarity between a document and a keyword (an OUT vector of a hyper document and an input vector of a word in a hyper document set are used). Tasks of calculating the similarities are very common in Internet-related products, for example, precise delivery of an advertisement (a similarity between an advertisement document and a search term of a user) and construction of a knowledge graph (a similarity between each entity and a description).

Citation recommendation: During drafting of an academic paper, a suitable paper may be automatically recommended for a specified segment of context as a citation (the OUT vector of the hyper document and the input vector of the word in the hyper document set are used). Assuming that a context word set is C, an existing paper may be scored by using the formula (4):

$$\text{score}(d) = \left(\frac{1}{|C|}\sum_{w \in C} w^I\right)^T d^O \qquad (4)$$

where w is a context word in C, $w^I$ is an input vector of a word, d is a to-be-scored document, and $d^O$ is an OUT vector of the to-be-scored document.

In this embodiment, when citation recommendation is performed for a specified context, an existing paper recommended may be determined in various manners. For example, all existing papers are scored, to obtain scores of the existing papers. One or more existing papers with the highest scores are selected according to the scores of the existing papers, and citation recommendation is performed for the context. In another example, a target threshold of a score of an existing paper for citation recommendation or the target threshold and a quantity of citation recommendations may be set. After an existing paper is scored, whether a score of the existing paper is greater than (or equal to) the target threshold is determined. If the score is greater than the target threshold, the existing paper is recommended to the context for citation. If the quantity of recommendations is 1, the process is ended. If the quantity of recommendations is n (n is greater than or equal to 2), whether a quantity of existing papers that have been recommended is equal to n is determined. If the quantity is equal to n, the process is ended. If the quantity is less than n, the scoring and determining operations are continuously performed until the quantity of the existing papers that have been recommended is equal to n.

In an embodiment of this application, after the first output vector is used and outputted as the output vector of the second object, an input vector corresponding to each word in a third object is obtained. A target parameter of the second object is determined according to the input vector of each word of the third object and the output vector of the second object. Whether to allow the second object to be cited by the third object is determined according to the target parameter.

In an embodiment of this application, that whether to allow the second object to be cited by the third object is determined according to the target parameter includes: determining, in a case that a value of the target parameter is higher than a second target threshold, to allow the second object to be cited by the third object; or determining, in a case that a value of the target parameter of the second object is the maximum in a candidate object set, to allow the second object to be cited by the third object, the candidate object set including the second object.

In an embodiment of this application, after whether to allow the second object to be cited by the third object is determined according to the target parameter, in a case that it is determined, according to the target parameter, to allow the second object to be cited by the third object, the following steps are performed: inserting a third hyperlink used for pointing to the second object at a target position of the third object; displaying, on the third object, prompt information used for prompting the third hyperlink, or receiving indication information used for indicating an insert position of the third hyperlink in the third object; and inserting the third hyperlink at the insert position in the third object according to the indication information.

In an embodiment of this application, the inserting a third hyperlink used for pointing to the second object at a target position of the third object includes: searching the third object for a target word, a similarity between an input vector corresponding to the target word and the output vector of the second object being higher than a third target threshold; and inserting the third hyperlink at a position following the target word in the third object.

For example, a hyperlink used for pointing to the second object may be automatically inserted at the target position of the third object. The foregoing target position may be a starting position or an end position of the third object or any position in the middle of the third object. The third object may alternatively be searched for the target word, a similarity between an input vector corresponding to the target word and the output vector of the second object being higher than a specified threshold, or a word in all words included in the third object, a similarity between an input vector of the word and the output vector of the second object being the highest (that is, the third object is searched for a word corresponding to a word vector most similar to the output vector of the second object. The hyperlink pointing to the second object is inserted at a position following the target word in the third object. In this manner, a terminal that displays the third object may determine an insert position of the third hyperlink.

In another example, indication information used for indicating an insert position of the third hyperlink in the third object may be received. The third hyperlink is inserted at the insert position in the third object according to the indication information. A display position of the prompt information may be a screen of a terminal device displaying the third object. After the prompt information is displayed, input information used for indicating the insert position of the third hyperlink in the third object is detected. The third hyperlink is inserted at the insert position in the third object according to the input information. In this manner, a user may specify an insert position of a hyperlink.

In still another example, indication information used for indicating an insert position of the third hyperlink in the third object may be received. The third hyperlink is inserted at the insert position in the third object according to the indication information. In this manner, a remote apparatus (for example, a server) may determine the insert position of the third hyperlink, and the terminal displaying the third object inserts the third hyperlink at the insert position according to the indication information.

Figure 8:
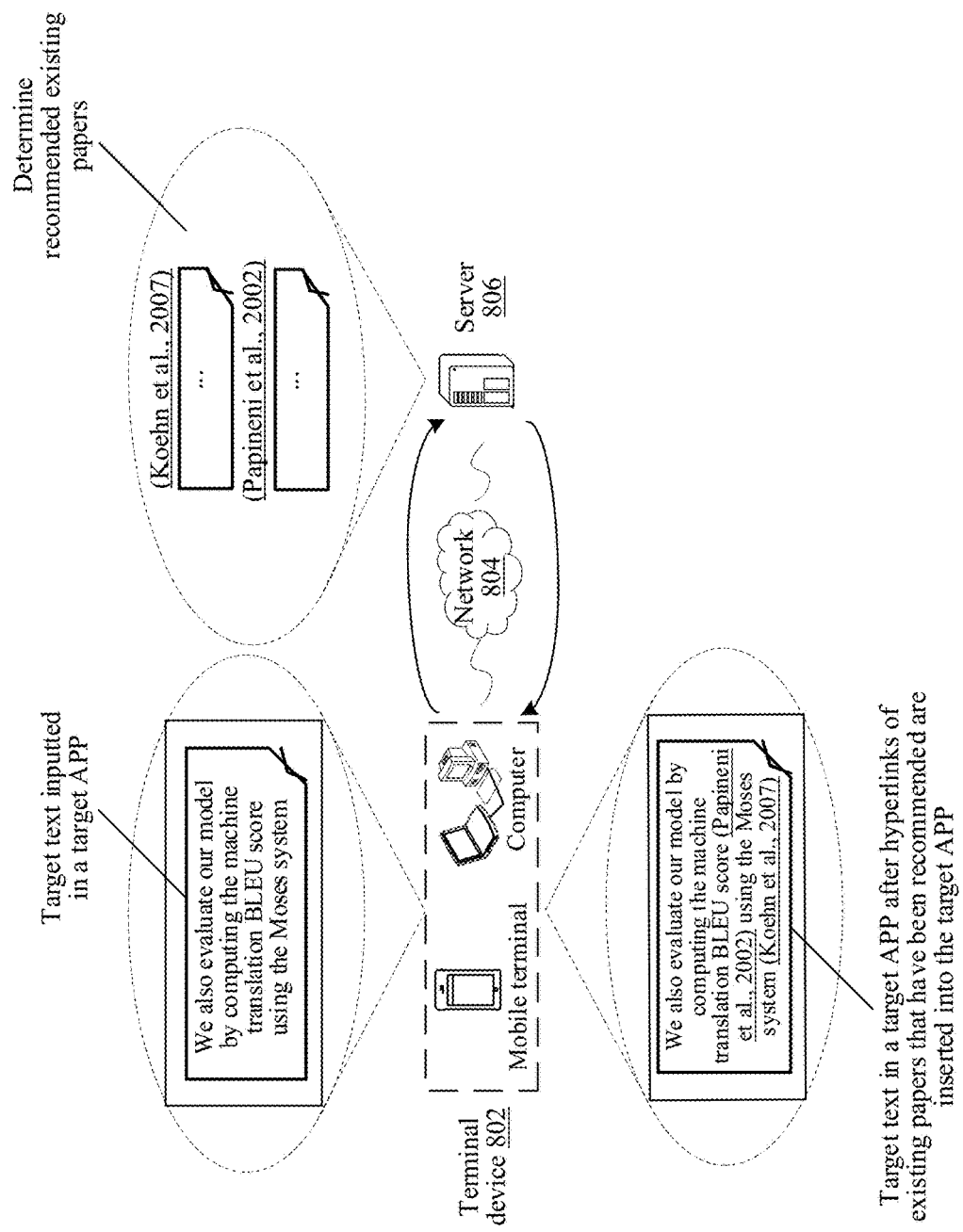
FIG. 8 is a schematic diagram of another hyperlink processing method according to an embodiment of this application.

A manner of inserting the hyperlink into the third object is described below by using an example. As shown in FIG. 8, a target APP is opened in a terminal device 802, and target text (the third object) is inputted in the target APP. The terminal device 802 obtains the inputted target text through the target APP, and sends the target text to a server through a network 804. The server 806 scores existing papers, and determines that existing papers recommended for the target text are two existing papers having the highest scores ((Koehn et al., 2007) and (Papineni et al., 2002)). Hyperlinks of the two existing papers are transmitted to the terminal device 802 (alternatively, the two existing papers or digests of the two existing papers are transmitted to the terminal device 802 for a user to determine whether to insert the existing papers and specific positions in the target text at which the existing papers are inserted). Prompt information is displayed on the target APP of the terminal device 802. The user determines, according to the prompt information, the insert positions of the existing papers: (Koehn et al., 2007) is inserted at a position following "Moses system", and (Papineni et al., 2002) is inserted at a position following "BLEU score". After a target instruction is received, hyperlinks of the two existing papers are inserted at the insert positions in the target text. Description of a hyperlink may be a document ID of an existing paper.

In this embodiment, first context information of a first hyperlink in a first object is converted into a first context vector. A first input vector of the first object is obtained in a case that the first object serves as a link source, the first object including information about the first hyperlink pointing to a second object. A first average vector is obtained according to the first context vector and the first input vector. At least one of the first input vector, the first context vector, and a first output vector corresponding to the second object is obtained. A similarity between the first output vector and the first average vector is calculated according to an adjustment result, and the first output vector is used and outputted as an output vector of the second object in a case that the similarity between the first output vector and the first average vector is greater than or equal to a first target threshold. The hyperlink object is represented by using an output vector, to avoid losing key information and improve completeness of information.

In another embodiment of this application, after the first output vector is used and outputted as the output vector of the second object, the foregoing method further includes the following step.

Update the first input vector and the first output vector to an adjusted first input vector and an adjusted first output vector.

In an embodiment of this application, after the first input vector and the first output vector are updated to an adjusted first input vector and an adjusted first output vector, the method further includes the following step:

Repeatedly perform the following steps:

Locate other hyperlinks in all the objects, and use the located other hyperlinks as a second hyperlink.

Convert second context information of the second hyperlink into a second context vector.

Obtain a second input vector of a source object of the second hyperlink in a case that the source object of the second hyperlink serves as a link source, the source object including information about the second hyperlink pointing to a target object.

Obtain a second average vector according to the second context vector and the second input vector.

Adjust at least one of the second input vector, the second context vector, or a second output vector corresponding to the target object.

Calculate a similarity between the second output vector and the second average vector according to an adjustment result, and use and output the second output vector as an output vector of the target object in a case that the similarity between the second output vector and the second average vector is greater than or equal to the first target threshold.

In this embodiment, the first input vector and the first output vector are updated to the adjusted first input vector and the adjusted first output vector, so that validity of the first input vector and the first output vector can be ensured. Further, the steps of locating hyperlinks in all objects and adjusting each hyperlink may improve a capability of representing the object by an input vector and an output vector of each object.

In another embodiment of this application, after the first output vector is used and outputted as the output vector of the second object, the foregoing method further includes:

obtaining an input vector of each word in a third object;

determining a target parameter of the second object according to the input vector of each word of the third object and the output vector of the second object; and determining, according to the target parameter, whether to allow the second object to be cited by the third object.

In an embodiment of this application, the determining, according to the target parameter, whether to allow the second object to be cited by the third object includes:

determining, in a case that a value of the target parameter is higher than a second target threshold, to allow the second object to be cited by the third object; or determining, in a case that a value of the target parameter of the second object is the maximum in a candidate object set, to allow the second object to be cited by the third object, the candidate object set including the second object.

In an embodiment of this application, after the determining, according to the target parameter, whether to allow the second object to be cited by the third object, the method further includes:

in response to determining, according to the target parameter, to allow the second object to be cited by the third object, inserting a third hyperlink used for pointing to the second object at a target position of the third object; and displaying, on the third object, prompt information used for prompting the third hyperlink; or receiving indication information used for indicating an insert position of the third hyperlink in the third object; and inserting the third hyperlink at the insert position in the third object according to the indication information.

In an embodiment of this application, the inserting a third hyperlink used for pointing to the second object at a target position of the third object includes:

searching the third object for a target word, a similarity between an input vector corresponding to the target word and the output vector of the second object being higher than a third target threshold; and inserting the third hyperlink at a position following the target word in the third object.

In this embodiment, citation recommendation is performed for the third object by using the output vector converted from the hyperlink, and after a hyperlink pointing to a recommended hyperlink object is inserted into the third object, to obtain an output vector, citation recommendation is performed for the third object, so that an application value of the hyperlink processing method and a usage value of the third object (for example, usage in scenarios such as paper drafting and web page designing) are improved.

Figure 9:
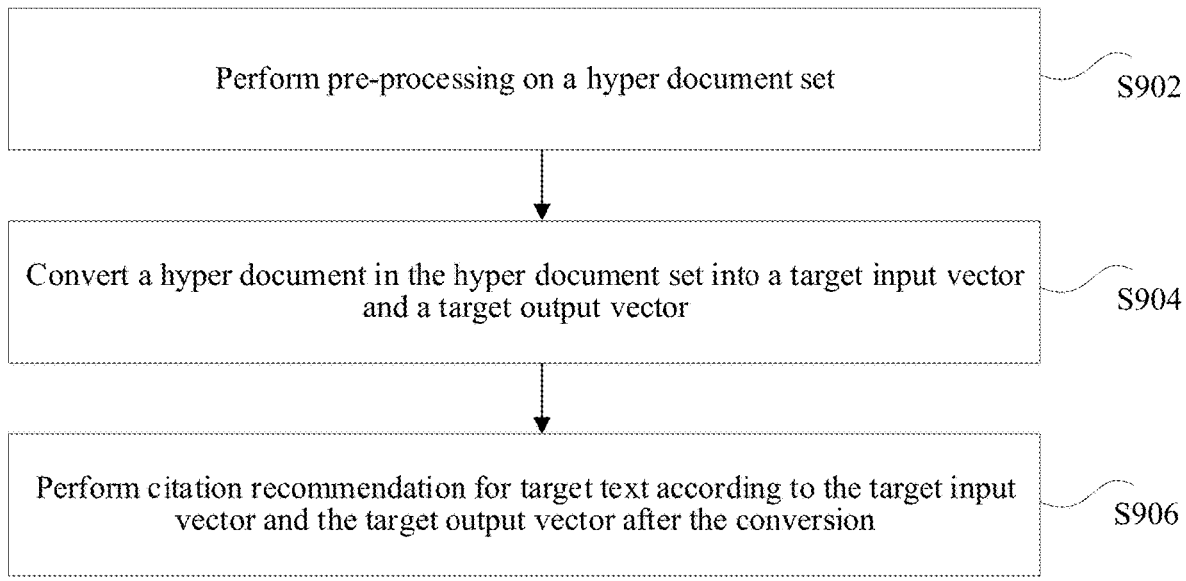
FIG. 9 is a schematic diagram of another hyperlink processing method according to an embodiment of this application.

The foregoing hyperlink processing method is described with reference to FIG. 9, where the hyperlink object is a hyper document. As shown in FIG. 9, the server performs pre-processing on a hyper document set through step S902, converts a hyper document in the hyper document set into a target input vector and a target output vector through step S904, and performs citation recommendation for target text through step S906.

Figure 10:
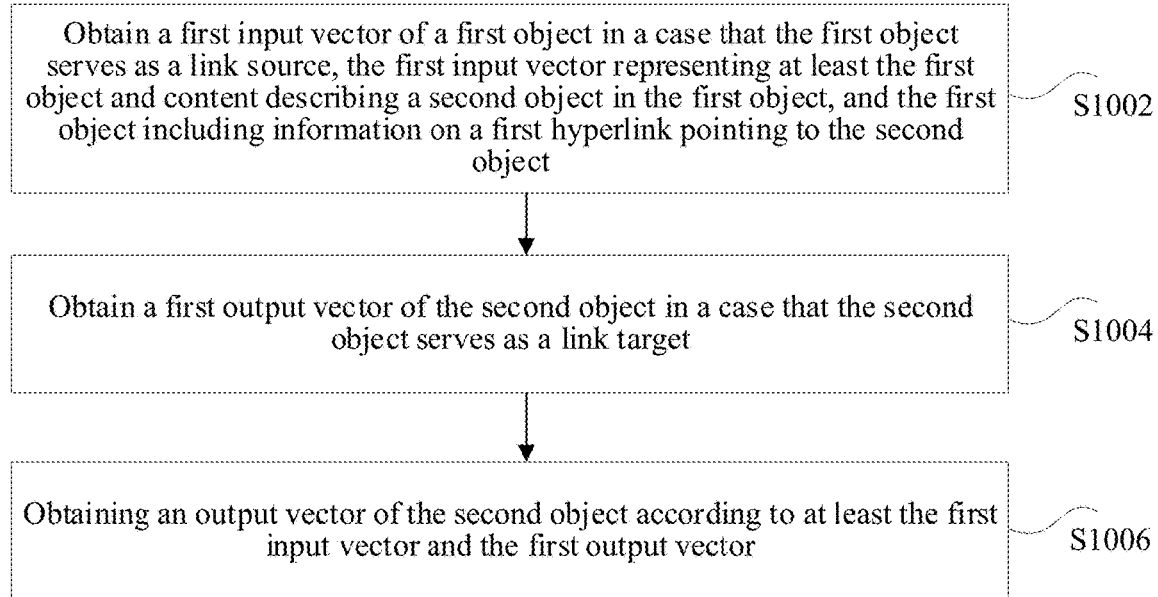
FIG. 10 is a schematic diagram of another hyperlink processing method according to an embodiment of this application.

This embodiment of this application further provides a hyperlink processing method executable by a computing device. As shown in FIG. 10, the method includes the following steps:

Step S1002: Obtain a first input vector of a first object in a case that the first object serves as a link source, the first input vector being used for representing at least the first object and content describing a second object in the first object, and the first object including information about a first hyperlink pointing to the second object.

Step S1004: Obtain a first output vector of the second object in a case that the second object serves as a link target.

Step S1006: Perform adjustment according to at least the first input vector and the first output vector to obtain an output vector of the second object.

In an embodiment of this application, the foregoing hyperlink processing method may be applied to, but is not limited to, a process such as classification, recommendation, or retrieval of a specific object.

In this embodiment, in the foregoing hyperlink processing method, a first input vector of a first object is obtained in a case that the first object serves as a link source, the first input vector being used for representing at least the first object and content describing a second object in the first object, and the first object including information about a first hyperlink pointing to the second object. A first output vector of the second object is obtained in a case that the second object serves as a link target. In addition, adjustment is performed according to at least the first input vector and the first output vector to obtain an output vector of the second object. Information about the hyperlink object is represented, in a case that the hyperlink object serves as link target, by using the output vector, thereby avoiding losing key information and achieving a technical effect of improving information completeness.

In an embodiment of this application, after the first input vector of the first object is obtained in a case that the first object serves as the link source, one or more word vectors corresponding to a first context of the first hyperlink may be obtained, the first context being a context obtained after the first hyperlink is removed from a context including the first hyperlink in the first object. A first average vector is obtained according to the first input vector and the one or more word vectors corresponding to the first context. At least one of the first input vector, the one or more word vectors corresponding to the first context, and the first output vector is adjusted according to the first average vector and the first output vector, to obtain an output vector of the second object.

In this embodiment, the first average vector may be obtained according to the first input vector and the first context vector. A manner of obtaining the first average vector may be: averaging the first input vector and an input vector corresponding to each word in a first context, to obtain the first average vector. A vector length of the first input vector is the same as a length of an input vector of a word in the context, and the first average vector may be obtained by averaging values of elements at respective positions in input vectors corresponding to words in the first input vector and the first context.

In this embodiment, the first input vector may be an initial input vector of the first object or may be an intermediate input vector of the first object obtained in a process of obtaining an input vector and an output vector of each hyperlink object in an iteration manner. The first output vector may be an initial output vector of the second object or may be an intermediate output vector of the second object obtained in a process of obtaining an input vector and an output vector of each hyperlink object in an iteration manner.

In an embodiment of this application, the adjusting at least one of the first input vector, the one or more word vectors corresponding to the first context, and the first output vector includes: calculating a similarity between the first average vector and the first output vector; adjusting at least one of the first input vector, the one or more word vectors corresponding to the first context, or the first output vector based on a similarity optimization algorithm, to make the similarity between the first average vector and the first output vector greater than or equal to a target threshold.

In this embodiment, the foregoing adjustment process may be inputting word vectors corresponding to respective words in the first input vector and the first context into a target model, obtaining, by the target model, the first average vector, comparing the first average vector with the first output vector of the second object, and increasing the similarity between the first average vector and the first output vector by adjusting at least one of the first average vector, the first input vector, and the first output vector.

In this embodiment, the input of the target model may include: an initial input vector and an initial output vector of each hyperlink object, and an initial input vector of each word in the hyperlink object set. The target model adjusts an input vector and an output vector of each hyperlink object and an input vector of each word in the hyperlink object set, to optimize a target function by using an optimization algorithm. Variables of the target function are the input vector and the output vector of the hyperlink object and the input vector of each word in the hyperlink object set. The target function is used for obtaining an input vector and an output vector of each hyperlink object and an input vector of each word in the hyperlink object set that satisfy the following condition: making a sum of similarities between average vectors of input vectors of source objects of respective hyperlinks in all hyperlinks included in the hyperlink object set and input vectors corresponding to words in contexts including the hyperlinks and output vectors of target objects of the hyperlinks the maximum.

In an embodiment of this application, after the output vector of the second object is obtained through adjustment, other hyperlinks in all objects may be located, and the located hyperlinks may be used as a first hyperlink. A source object of the hyperlink may be used as a first object, and a target object of the hyperlink may be used as a second object. The foregoing steps are repeatedly performed until hyperlinks included in all the objects are all processed.

In this embodiment, after all the located hyperlinks are processed, the steps of locating all the hyperlinks and processing the located hyperlinks may be repeatedly performed, to obtain more accurate vectorized representation of a hyperlink object.

In this embodiment, a first input vector of a first object is obtained in a case that the first object serves as a link source, the first input vector being used for representing at least the first object and content describing a second object in the first object, and the first object including information about a first hyperlink pointing to the second object. A first output vector of the second object is obtained in a case that the second object serves as a link target. In addition, adjustment is performed according to at least the first input vector and the first output vector to obtain an output vector of the second object. The hyperlink object is represented by using the output vector, to avoid losing key information and improve completeness of information.

In another embodiment of this application, after the first input vector of the first object is obtained in a case that the first object serves as the link source, the foregoing method further includes the following steps:

Obtain one or more word vectors corresponding to a first context of the first hyperlink, the first context being a context obtained after the first hyperlink is removed from a context including the first hyperlink in the first object.

Obtain a first average vector according to the first input vector and the one or more word vectors corresponding to the first context.

The performing adjustment according to at least the first input vector and the first output vector to obtain an output vector of the second object includes:

Adjust at least one of the first input vector, the one or more word vectors corresponding to the first context, or the first output vector according to the first average vector and the first output vector, to obtain the output vector of the second object.

In an embodiment of this application, the adjusting at least one of the first input vector, the one or more word vectors corresponding to the first context, and the first output vector includes:

Calculate a similarity between the first average vector and the first output vector.

Adjust at least one of the first input vector, the one or more word vectors corresponding to the first context, or the first output vector based on a similarity optimization algorithm, to make the similarity between the first average vector and the first output vector greater than or equal to a target threshold.

In this embodiment, at least one of the first input vector, the one or more word vectors corresponding to the first context, and the first output vector is adjusted according to the first average vector and the first output vector, to obtain the output vector of the second object, so that a capability of representing the second object by the output vector can be ensured. Further, at least one of the first input vector, the one or more word vectors corresponding to the first context, and the first output vector is adjusted according to the similarity between the first average vector and the first output vector by using a similarity optimization algorithm, so that a capability of representing the second object by the output vector can be improved.

In an embodiment of this application, after the output vector of the second object is obtained through adjustment, the foregoing method further includes the following step:

Repeatedly perform the following steps:

Locate other hyperlinks in all the objects according to a predetermined rule, and use the located other hyperlinks as a second hyperlink.

Obtain a second input vector of a source object of the second hyperlink in a case that the source object of the second hyperlink serves as a link source, the second input vector being used for representing at least the source object and content describing a target object in the source object, the source object including information about the second hyperlink pointing to the target object.

Obtain a second output vector of the target object in a case that the target object serves as a link target.

Perform adjustment at least according to the second input vector and the second output vector to obtain an output vector of the target object.

In this embodiment, the steps of locating hyperlinks in all objects and adjusting each hyperlink may improve a capability of representing the object by an input vector and an output vector of each object.

To make the description simple, the foregoing method embodiments are stated as a series of action combinations. However, a person skilled in the art needs to learn that this application is not limited on the described sequence of the actions because according to this application, some steps may use another sequence or may be simultaneously performed. In addition, it is to be understood by a person skilled in the art that the embodiments described in the specification are all exemplary embodiments and the related actions and modules are not mandatory to this application.

Through the descriptions of the foregoing implementations, a person skilled in the art may clearly understand that the method according to the foregoing embodiments may be implemented by means of software and a necessary general hardware platform, and certainly, may alternatively be implemented by hardware, but in many cases, the former manner is a better implementation. Based on such an understanding, the technical solutions of this application essentially, or the part contributing to the related art may be implemented in a form of a software product. The computer software product is stored in a non-transitory storage medium (for example, a ROM/RAM, a magnetic disk, or an optical disc), and includes several instructions for instructing a terminal device (which may be a mobile phone, a computer, a server, a network device, or the like) to perform the methods according to the embodiments of this application.

Figure 11A:
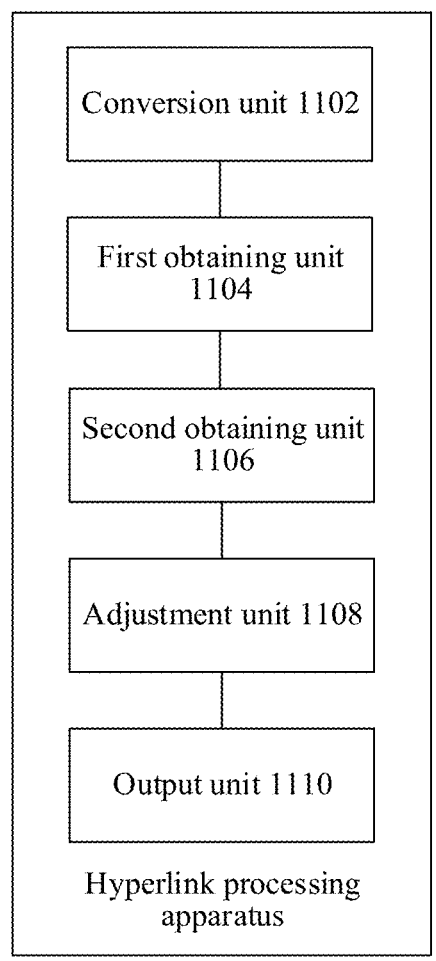
FIG. 11A is a schematic structural diagram of a hyperlink processing apparatus according to an embodiment of this application.

An embodiment of this application further provides a hyperlink processing apparatus for performing the foregoing hyperlink processing method. As shown in FIG. 11A, the apparatus includes:

a conversion unit 1102, configured to convert first context information of a first hyperlink in a first object into a first context vector;

a first obtaining unit 1104, configured to obtain a first input vector of the first object in a case that the first object serves as a link source, the first object including information about the first hyperlink pointing to a second object;

a second obtaining unit 1106, configured to obtain a first average vector according to the first context vector and the first input vector;

an adjustment unit 1108, configured to adjust at least one of the first input vector, the first context vector, and a first output vector corresponding to the second object; and an output unit 1110, configured to calculate a similarity between the first output vector and the first average vector according to an adjustment result, and use and output the first output vector as an output vector of the second object in a case that the similarity between the first output vector and the first average vector is greater than or equal to a first target threshold.

In an embodiment of this application, the foregoing hyperlink processing apparatus may be applied to, but is not limited to, a process such as classification, recommendation, or retrieval of a specific object.

In this embodiment, through the foregoing hyperlink processing apparatus, first context information of a first hyperlink in a first object is converted into a first context vector. A first input vector of the first object is obtained in a case that the first object serves as a link source, the first object including information about the first hyperlink pointing to a second object. A first average vector is obtained according to the first context vector and the first input vector. At least one of the first average vector, the first input vector, and a first output vector corresponding to the second object is adjusted. A similarity between the first output vector and the first average vector is calculated according to an adjustment result, and the first output vector is used and outputted as an output vector of the second object in a case that the similarity between the first output vector and the first average vector is greater than or equal to a first target threshold, thereby avoiding losing key information and achieving a technical effect of improving information completeness.

The second obtaining unit 1106 may be specifically configured to average the first input vector and an input vector corresponding to each word in a first context, the first context being a context obtained after the first hyperlink is removed from a context including the first hyperlink in the first object.

In this embodiment, the first average vector may be obtained according to the first input vector and the first context vector. A manner of obtaining the first average vector may be: averaging the first input vector and an input vector corresponding to each word in a first context, to obtain the first average vector. A vector length of the first input vector is the same as a length of an input vector of a word in the context, and the first average vector may be obtained by averaging values of elements at respective positions in input vectors corresponding to words in the first input vector and the first context.

In this embodiment, the first input vector may be an initial input vector of the first object or may be an intermediate input vector of the first object obtained in a process of obtaining an input vector and an output vector of each hyperlink object in an iteration manner. The first output vector may be an initial output vector of the second object or may be an intermediate output vector of the second object obtained in a process of obtaining an input vector and an output vector of each hyperlink object in an iteration manner.

In this embodiment, for one hyperlink, a similarity between an output vector of the target object and an average vector (an average vector of the input vector of the source object and the context vector describing the target object in the source object) is made through adjustment greater than or equal to the first target threshold, so that the output vector of the target object can more accurately represent the source object (the input vector of the source object) citing the target object and information (the context vector of the hyperlink) used for describing the target object in the source object citing the target object, and the input vector of the source object can more accurately represent the content (the input vector of the source object) thereof and the cited target object (the output vector of the target object).

In this embodiment, the foregoing adjustment process may be inputting word vectors corresponding to respective words in the first input vector and the first context into a second target model, obtaining, by the second target model, the first average vector, comparing the first average vector with the first output vector of the second object, and increasing the similarity between the first average vector and the first output vector by adjusting at least one of the first input vector, the first context vector, and the first output vector.

In this embodiment, the input of the second target model may include: an initial input vector and an initial output vector of each hyperlink object, and an initial input vector of each word in the hyperlink object set. The second target model adjusts an input vector and an output vector of each hyper document and an input vector of each word in the hyperlink object set, to optimize a target function by using an optimization algorithm. Variables of the target function are the input vector and the output vector of the hyperlink object and the input vector of each word in the hyperlink object set. The target function is used for obtaining an input vector and an output vector of each hyperlink object and an input vector of each word in the hyperlink object set that satisfy the following condition: making a sum of similarities between average vectors of input vectors of source objects of respective hyperlinks in all hyperlinks included in the hyperlink object set and input vectors corresponding to words in contexts including the hyperlinks and output vectors of target objects of the hyperlinks the maximum.

After the first output vector is used and outputted as the output vector of the second object, the first input vector and the first output vector are updated to an adjusted first input vector and an adjusted first output vector.

In this embodiment, after the first output vector is used and outputted as the output vector of the second object, the outputted output vector may be used for updating the first output vector. Alternatively, the first input vector may be used and outputted as the input vector of the first object, and the outputted input vector may be used to update the first input vector. Alternatively, an input vector of each word in the adjusted average vector may be used and outputted as an input vector of the corresponding word, and the outputted input vector of the word may be used to update the input vector of the word.

After the first input vector and the first output vector are updated to the adjusted first input vector and the adjusted first output vector, other hyperlinks in all objects may be located, and the located hyperlinks may be used as a first hyperlink. A source object of the hyperlink may be used as a first object, and a target object of the hyperlink may be used as a second object. The foregoing steps are repeatedly performed until hyperlinks included in all the objects are all processed.

In this embodiment, after all the located hyperlinks are processed, the steps of locating all the hyperlinks and processing the located hyperlinks may be repeatedly performed, to obtain more accurate vectorized representation of a hyperlink object.

In this embodiment, all the foregoing objects may be all objects in the hyperlink object set. With regard to the hyperlinks in all the objects, all the hyperlinks included in the hyperlink object set may be obtained in a manner of obtaining a hyperlink included in each object in the hyperlink object set (the hyperlink may be represented in a manner of $<d_s, C, d_t>$).

In this embodiment, after the first output vector is used and outputted as the output vector of the second object, the obtained output vector (and input vector) may be used in a plurality of scenarios, and the foregoing scenarios may include, but are not limited to: hyper document classification, similar document and keyword retrieval, and citation recommendation.

After the first output vector is used and outputted as the output vector of the second object, an input vector corresponding to each word in a third object is obtained. A target parameter of the second object is determined according to the input vector of each word of the third object and the output vector of the second object. Whether to allow the second object to be cited by the third object is determined according to the target parameter.

That whether to allow the second object to be cited by the third object is determined according to the target parameter, includes: determining, in a case that a value of the target parameter is higher than a second target threshold, to allow the second object to be cited by the third object; or determining, in a case that a value of the target parameter of the second object is the maximum in a candidate object set, to allow the second object to be cited by the third object, the candidate object set including the second object.

After whether to allow the second object to be cited by the third object is determined according to the target parameter, in a case that it is determined, according to the target parameter, to allow the second object to be cited by the third object, the following steps are performed: inserting a third hyperlink used for pointing to the second object at a target position of the third object; displaying, on the third object, prompt information used for prompting the third hyperlink; or receiving indication information used for indicating an insert position of the third hyperlink in the third object; and inserting the third hyperlink at the insert position in the third object according to the indication information.

The inserting a third hyperlink used for pointing to the second object at a target position of the third object includes: searching the third object for a target word, a similarity between an input vector corresponding to the target word and the output vector of the second object being higher than a third target threshold; and inserting the third hyperlink at a position following the target word in the third object.

In this embodiment, first context information of a first hyperlink in a first object is converted into a first context vector. A first input vector of the first object is obtained in a case that the first object serves as a link source, the first object including information about the first hyperlink pointing to a second object. A first average vector is obtained according to the first context vector and the first input vector. At least one of the first input vector, the first context vector, and a first output vector corresponding to the second object is obtained. A similarity between the first output vector and the first average vector is calculated according to an adjustment result, and the first output vector is used and outputted as an output vector of the second object in a case that the similarity between the first output vector and the first average vector is greater than or equal to a first target threshold. The hyperlink object is represented by using an output vector, to avoid losing key information and improve completeness of information.

Figure 11B:
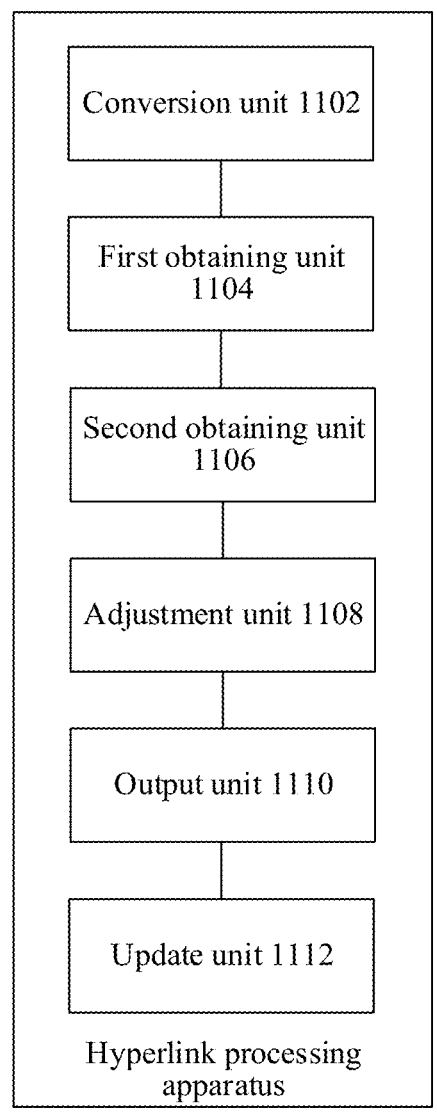
FIG. 11B is a schematic structural diagram of a hyperlink processing apparatus according to an embodiment of this application.

In an embodiment of this application, as shown in FIG. 11B, the foregoing apparatus further includes:

an update unit 1112, configured to update, after the first output vector is used and outputted as the output vector of the second object, the first input vector and the first output vector to an adjusted first input vector and an adjusted first output vector.

Figure 11C:
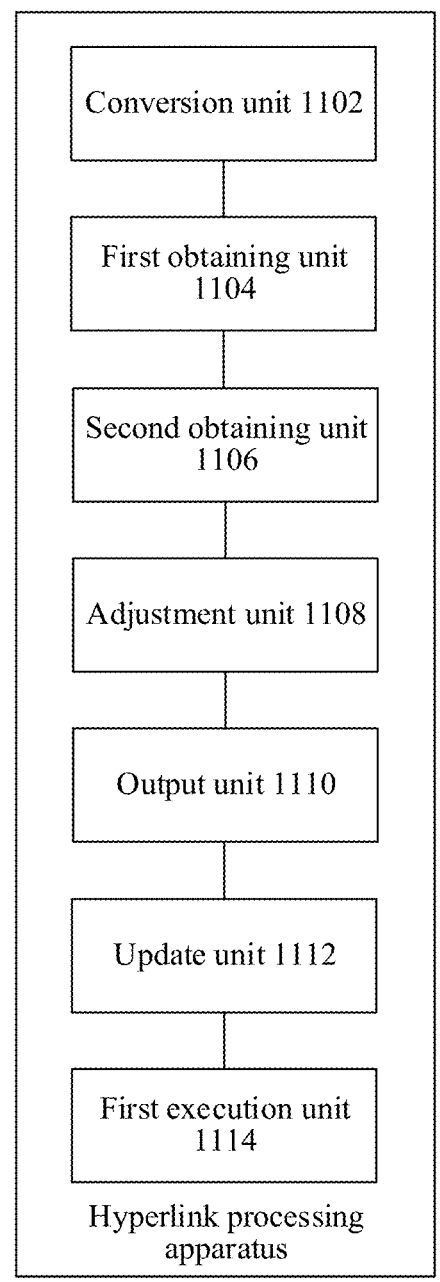
FIG. 11C is a schematic structural diagram of a hyperlink processing apparatus according to an embodiment of this application.

In some embodiments, as shown in FIG. 11C, the foregoing apparatus further includes:

a first execution unit 1114, configured to repeatedly perform the following steps after the update unit 1112 updates the first input vector and the first output vector to the adjusted first input vector and the adjusted first output vector:

locating other hyperlinks in all the objects, and using the located other hyperlinks as a second hyperlink; converting second context information of the second hyperlink into a second context vector; obtaining a second input vector of a source object of the second hyperlink in a case that the source object of the second hyperlink serves as a link source, the source object including information about the second hyperlink pointing to a target object; obtaining a second average vector according to the second context vector and the second input vector; adjusting at least one of the second input vector, the second context vector, or a second output vector corresponding to the target object; and calculating a similarity between the second output vector and the second average vector according to an adjustment result, and using and outputting the second output vector as an output vector of the target object in a case that the similarity between the second output vector and the second average vector is greater than or equal to the first target threshold.

In this embodiment, the first input vector and the first output vector are updated to the adjusted first input vector and the adjusted first output vector, so that validity of the first input vector and the first output vector can be ensured. Further, the steps of locating hyperlinks in all objects and adjusting each hyperlink may improve a capability of representing the object by an input vector and an output vector of each object.

Figure 11D:
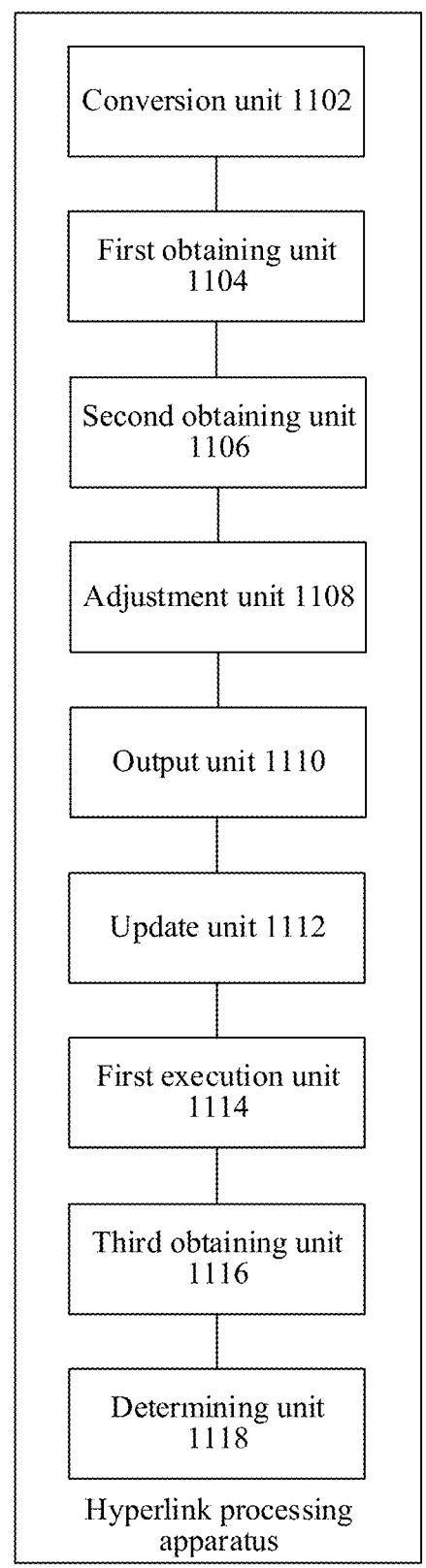
FIG. 11D is a schematic structural diagram of a hyperlink processing apparatus according to an embodiment of this application.

In an embodiment of this application, as shown in FIG. 11D, the foregoing apparatus further includes:

a third obtaining unit 1116, configured to obtain, after the first output vector is used and outputted as the output vector of the second object, an input vector corresponding to each word in a third object; and a determining unit 1118, configured to determine a target parameter of the second object according to the input vector of each word of the third object and the output vector of the second object; and whether to allow the second object to be cited by the third object is determined according to the target parameter.

In another embodiment, the determining unit 1118 includes:

a first determining module, configured to determine, in a case that a value of the target parameter is higher than a second target threshold, to allow the second object to be cited by the third object; or determine, in a case that a value of the target parameter of the second object is the maximum in a candidate object set, to allow the second object to be cited by the third object, the candidate object set including the second object.

Figure 11E:
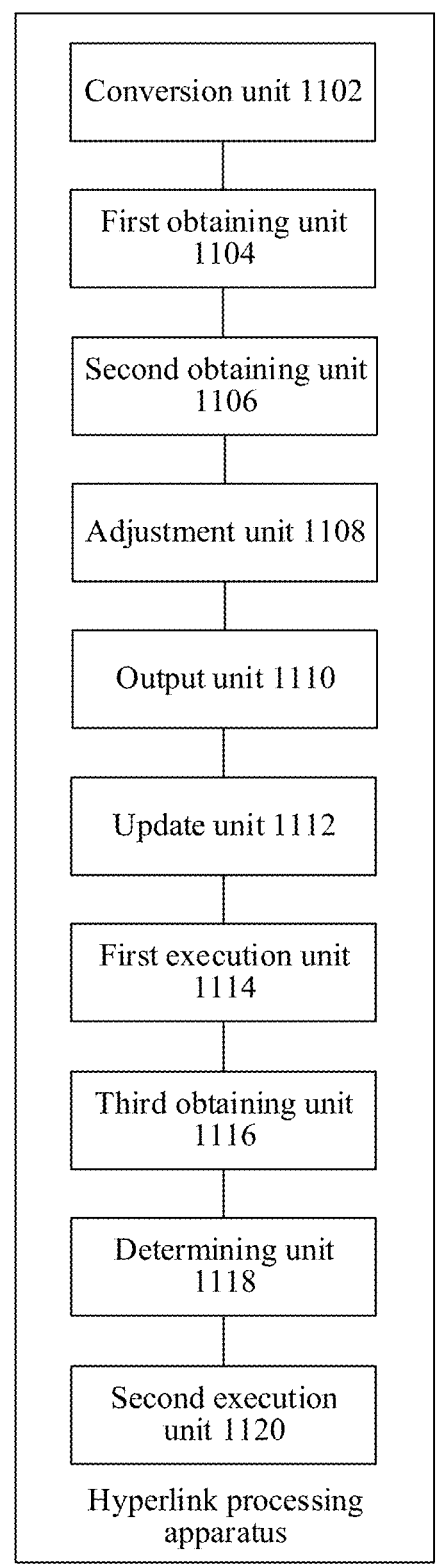
FIG. 11E is a schematic structural diagram of a hyperlink processing apparatus according to an embodiment of this application.

In another embodiment, as shown in FIG. 11E, the foregoing apparatus further includes:

a second execution unit 1120, configured to perform, in response to determining, according to the target parameter, to allow the second object to be cited by the third object, the following steps:

inserting a third hyperlink used for pointing to the second object at a target position of the third object; and displaying, on the third object, prompt information used for prompting the third hyperlink; or receiving indication information used for indicating an insert position of the third hyperlink in the third object; and inserting the third hyperlink at the insert position in the third object according to the indication information.

In another embodiment, the second execution unit 1120 is specifically configured to:

search the third object for a target word, a similarity between an input vector corresponding to the target word and the output vector of the second object being higher than a third target threshold; and insert the third hyperlink at a position following the target word in the third object.

In this embodiment, citation recommendation is performed for the third object by using the output vector converted from the hyperlink, and after a hyperlink pointing to a recommended hyperlink object is inserted into the third object, to obtain an output vector, citation recommendation is performed for the third object, so that an application value of the hyperlink processing method and a usage value of the third object (for example, usage in scenarios such as paper drafting and web page designing) are improved.

Figure 12A:
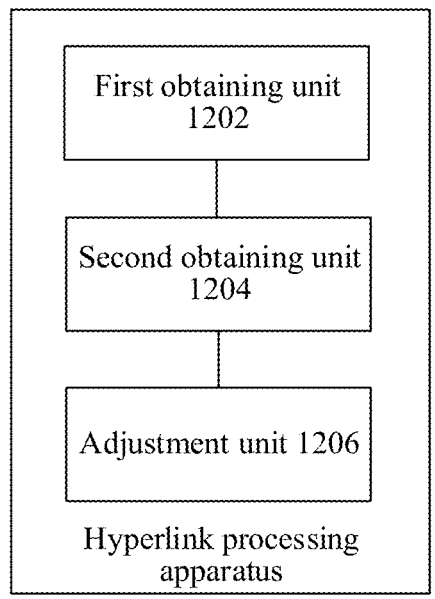
FIG. 12A is a schematic structural diagram of another hyperlink processing apparatus according to an embodiment of this application.

An embodiment of this application further provides a hyperlink processing apparatus. As shown in FIG. 12A, the apparatus includes:

a first obtaining unit 1202, configured to obtain a first input vector of a first object in a case that the first object serves as a link source, the first input vector being used for representing at least the first object and content describing a second object in the first object, and the first object including information about a first hyperlink pointing to the second object;

a second obtaining unit 1204, configured to obtain a first output vector of the second object in a case that the second object serves as a link target; and an adjustment unit 1206, configured to perform adjustment according to at least the first input vector and the first output vector to obtain an output vector of the second object.

In an embodiment of this application, the foregoing hyperlink processing apparatus may be applied to, but is not limited to, a process such as classification, recommendation, or retrieval of a specific object.

In this embodiment, through the foregoing hyperlink processing apparatus, a first input vector of a first object is obtained in a case that the first object serves as a link source, the first input vector being used for representing at least the first object and content describing a second object in the first object, and the first object including information about a first hyperlink pointing to the second object. A first output vector of the second object is obtained in a case that the second object serves as a link target. In addition, adjustment is performed according to at least the first input vector and the first output vector to obtain an output vector of the second object. Information about the hyperlink object is represented, in a case that the hyperlink object serves as link target, by using the output vector, thereby avoiding losing key information and achieving a technical effect of improving information completeness.

In another embodiment of this application, after the first input vector of the first object is obtained in a case that the first object serves as the link source, one or more word vectors corresponding to a first context of the first hyperlink may be obtained, the first context being a context obtained after the first hyperlink is removed from a context including the first hyperlink in the first object. A first average vector is obtained according to the first input vector and the one or more word vectors corresponding to the first context. At least one of the first input vector, the one or more word vectors corresponding to the first context, and the first output vector is adjusted according to the first average vector and the first output vector, to obtain an output vector of the second object.

In this embodiment, the first average vector may be obtained according to the first input vector and the first context vector. A manner of obtaining the first average vector may be: averaging the first input vector and an input vector corresponding to each word in a first context, to obtain the first average vector. A vector length of the first input vector is the same as a length of an input vector of a word in the context, and the first average vector may be obtained by averaging values of elements at respective positions in input vectors corresponding to words in the first input vector and the first context.

In this embodiment, the first input vector may be an initial input vector of the first object or may be an intermediate input vector of the first object obtained in a process of obtaining an input vector and an output vector of each hyperlink object in an iteration manner. The first output vector may be an initial output vector of the second object or may be an intermediate output vector of the second object obtained in a process of obtaining an input vector and an output vector of each hyperlink object in an iteration manner.

In another embodiment, the adjusting at least one of the first input vector, the one or more word vectors corresponding to the first context, or the first output vector includes: calculating a similarity between the first average vector and the first output vector; adjusting at least one of the first input vector, the one or more word vectors corresponding to the first context, and the first output vector based on a similarity optimization algorithm, to make the similarity between the first average vector and the first output vector greater than or equal to a target threshold.

In this embodiment, the foregoing adjustment process may be inputting word vectors corresponding to respective words in the first input vector and the first context into a target model, obtaining, by the target model, the first average vector, comparing the first average vector with the first output vector of the second object, and increasing the similarity between the first average vector and the first output vector by adjusting at least one of the first average vector, the first input vector, or the first output vector.

In this embodiment, the input of the target model may include: an initial input vector and an initial output vector of each hyperlink object, and an initial input vector of each word in the hyperlink object set. The target model adjusts an input vector and an output vector of each hyperlink object and an input vector of each word in the hyperlink object set, to optimize a target function by using an optimization algorithm. Variables of the target function are the input vector and the output vector of the hyperlink object and the input vector of each word in the hyperlink object set. The target function is used for obtaining an input vector and an output vector of each hyperlink object and an input vector of each word in the hyperlink object set that satisfy the following condition: making a sum of similarities between average vectors of input vectors of source objects of respective hyperlinks in all hyperlinks included in the hyperlink object set and input vectors corresponding to words in contexts including the hyperlinks and output vectors of target objects of the hyperlinks the maximum.

In another embodiment, after the output vector of the second object is obtained through adjustment, other hyperlinks in all objects may be located, and the located hyperlinks may be used as a first hyperlink. A source object of the hyperlink may be used as a first object, and a target object of the hyperlink may be used as a second object. The foregoing steps are repeatedly performed until hyperlinks included in all the objects are all processed.

In this embodiment, after all the located hyperlinks are processed, the steps of locating all the hyperlinks and processing the located hyperlinks may be repeatedly performed, to obtain more accurate vectorized representation of a hyperlink object.

In this embodiment, a first input vector of a first object is obtained in a case that the first object serves as a link source, the first input vector being used for representing at least the first object and content describing a second object in the first object, and the first object including information about a first hyperlink pointing to the second object. A first output vector of the second object is obtained in a case that the second object serves as a link target. In addition, adjustment is performed according to at least the first input vector and the first output vector to obtain an output vector of the second object. The hyperlink object is represented by using the output vector, to avoid losing key information and improve completeness of information.

Figure 12B:
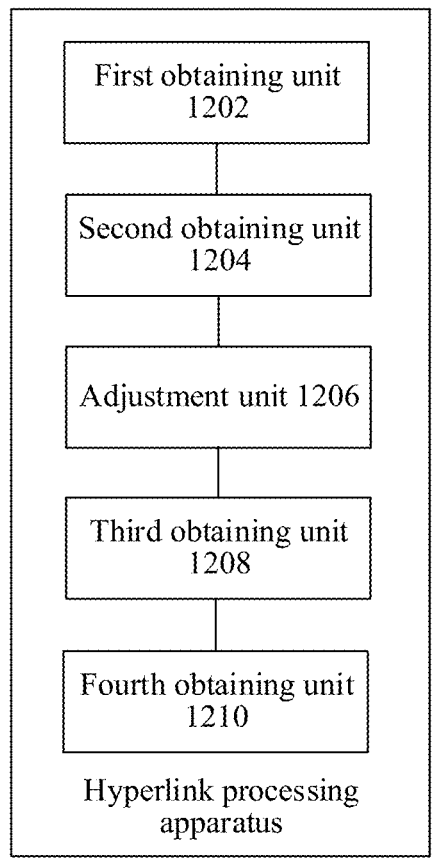
FIG. 12B is a schematic structural diagram of another hyperlink processing apparatus according to an embodiment of this application.

In an embodiment of this application, as shown in FIG. 12B, the foregoing apparatus further includes:

a third obtaining unit 1208, configured to obtain, after the first input vector of the first object is obtained in a case that the first object serves as the link source, one or more word vectors corresponding to a first context of the first hyperlink, the first context being a context obtained after the first hyperlink is removed from a context including the first hyperlink in the first object; and a fourth obtaining unit 1210, configured to obtain a first average vector according to the first input vector and the one or more word vectors corresponding to the first context.

The adjustment unit 1206 includes: an adjustment module, configured to adjust at least one of the first input vector, the one or more word vectors corresponding to the first context, or the first output vector according to the first average vector and the first output vector, to obtain an output vector of the second object.

In an embodiment of this application, the adjustment module includes:

a calculation sub-module, configured to calculate a similarity between the first average vector and the first output vector; and an adjustment sub-module, configured to adjust at least one of the first input vector, the one or more word vectors corresponding to the first context, or the first output vector based on a similarity optimization algorithm, to make the similarity between the first average vector and the first output vector greater than or equal to a target threshold.

In this embodiment, at least one of the first input vector, the one or more word vectors corresponding to the first context, and the first output vector is adjusted according to the first average vector and the first output vector, to obtain the output vector of the second object, so that a capability of representing the second object by the output vector can be ensured. Further, at least one of the first input vector, the one or more word vectors corresponding to the first context, and the first output vector is adjusted according to the similarity between the first average vector and the first output vector by using a similarity optimization algorithm, so that a capability of representing the second object by the output vector can be improved.

Figure 12C:
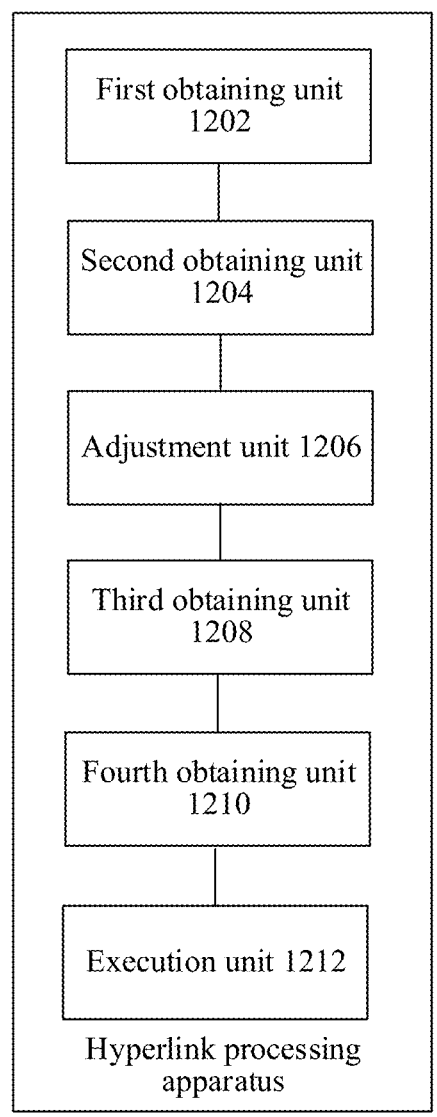
FIG. 12C is a schematic structural diagram of another hyperlink processing apparatus according to an embodiment of this application.

In an embodiment of this application, as shown in FIG. 12C, the foregoing apparatus further includes:

an execution unit 1212, configured to perform the following operations repeatedly, and output output vectors of all objects:

locating other hyperlinks in all the objects according to a predetermined rule, and using the located other hyperlinks as a second hyperlink;

obtaining a second input vector of a source object of the second hyperlink in a case that the source object of the second hyperlink serves as a link source, the second input vector being used for at least representing the source object and content describing a target object in the source object, the source object including information about the second hyperlink pointing to the target object;

obtaining a second output vector of the target object in a case that the target object serves as a link target; and performing adjustment at least according to the second input vector and the second output vector to obtain an output vector of the target object.

In this embodiment, the steps of locating hyperlinks in all objects and adjusting each hyperlink improve a capability of representing the object by an input vector and an output vector of each object.

An embodiment of this application further provides a non-transitory storage medium, storing a computer program, the computer program being used for performing operations in any one of the foregoing method embodiments when run.

In this embodiment, a person of ordinary skill in the art may understand that all or some of the steps of the various methods in the foregoing embodiments may be implemented by a program instructing relevant hardware. The program may be stored in a machine-readable non-transitory storage medium. The storage medium may include: a flash drive, a Read-Only Memory (ROM), a Random Access Memory (RAM), a magnetic disk, an optical disc, and the like.

Figure 13:
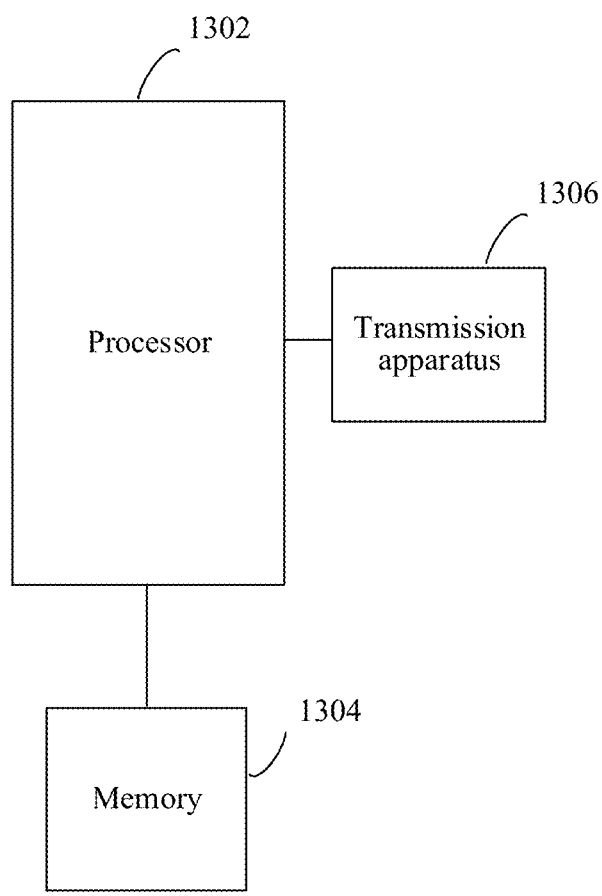
FIG. 13 is a schematic structural diagram of an electronic device according to an embodiment of this application.

An embodiment of this application further provides an electronic device for performing the foregoing hyperlink processing method. As shown in FIG. 13, the electronic device includes: a processor 1302, a memory 1304, a transmission apparatus 1306, and the like. The memory stores a computer program, and the processor is configured to perform steps in any one of the foregoing method embodiments by executing the computer program.

In this embodiment, the electronic device may be located in at least one of a plurality of network devices in a computer network.

A person of ordinary skill in the art may understand that, the structure shown in FIG. 13 is only illustrative. The electronic device may be a terminal device or a server such as a smartphone (for example, an Android mobile phone or an iOS mobile phone), a tablet computer, a palmtop computer, a mobile Internet device (MID), or a PAD. FIG. 13 does not constitute a limitation on the structure of the electronic device. For example, the electronic device may further include more or fewer components (such as a network interface) than those shown in FIG. 13, or has a configuration different from that shown in FIG. 13.

The memory 1304 may be configured to store a software program and a module, for example, a program instruction/module corresponding to the hyperlink processing method and apparatus in the embodiments of this application, and the processor 1302 performs various functional applications and data processing by running the software program and the module stored in the memory 1304, that is, implementing the foregoing hyperlink processing method. The memory 1304 can include a high speed random access memory, and can further include a non-volatile memory, for example, one or more magnetic storage apparatuses, a flash memory, or another non-volatile solid-state memory. In some embodiments, the memory 1304 may further include memories remotely disposed relative to the processor 1302, and the remote memories may be connected to a terminal by using a network. An example of the foregoing network includes, but is not limited to, the Internet, an intranet, a local area network, a mobile communications network and a combination thereof.

The foregoing transmission apparatus 1306 is configured to receive or transmit data through a network. Specific examples of the foregoing network can include a wired network and a wireless network. In an example, the transmission apparatus 1306 includes a network interface controller (NIC) that can be connected to another network device and router by using a cable, to communicate with the Internet or a local area network. In an example, the transmission apparatus 1306 is a radio frequency (RF) module that is configured to communicate with the Internet in a wireless manner.

The sequence numbers of the foregoing embodiments of this application are merely for description purpose, and do not imply the preference among the embodiments.

In a case that the integrated unit in the foregoing embodiments is implemented in the form of a software function unit and sold or used as an independent product, the integrated unit can be stored in the foregoing machine-readable non-transitory storage medium. Based on such an understanding, the technical solutions of this application essentially, or the part contributing to the existing technology, or all or some of the technical solutions may be implemented in a form of a software product. The computer software product is stored in a non-transitory storage medium and includes several instructions for instructing one or more computer devices (which may be a personal computer, a server, a network device, or the like) to perform all or some of the steps of the methods described in the embodiments of this application.

The foregoing descriptions are merely exemplary embodiment of this application. A person of ordinary skill in the art can further make several improvements and refinements without departing from the principle of this application, and the improvements and refinements shall fall within the protection scope of this application.

What is claimed is:

1. A hyperlink processing method, performed by a computing device, the method comprises:
converting first context information of a first hyperlink in a first object into a first context vector;
obtaining a first input vector of the first object in response to the first object serving as a link source, the first object comprising information on the first hyperlink pointing to a second object;
averaging the first context vector and the first input vector to obtain a first average vector;
improving similarity between the first average vector and a first output vector corresponding to the second object by executing a natural language processing model to adjust at least one of the first input vector, the first context vector, or the first output vector corresponding to the second object, the natural language processing model being trained based on an input vector and an output vector of an training object, the input vector differing from the output vector, the input vector representing information related to the training object serving as a link source, the output vector representing information related to the training object serving as a link target;
calculating a similarity between the first output vector and the first average vector according to a result of the adjusting;
outputting the first output vector as an output vector of the second object in response to the similarity between the first output vector and the first average vector being greater than or equal to a first target threshold; and
storing the output vector of the second object in memory.

2. The method of claim 1, further comprising:
after outputting the first output vector as the output vector of the second object, updating the first input vector and the first output vector to an adjusted first input vector and an adjusted first output vector.

3. The method of claim 2, further comprising:
after updating the first input vector and the first output vector to the adjusted first input vector and the adjusted first output vector, in order to output output vectors of a plurality of objects, repeatedly performing:
locating a hyperlink in the plurality of objects;
using the located hyperlink as a second hyperlink;
converting second context information of the second hyperlink into a second context vector;
obtaining a second input vector of a source object of the second hyperlink in response to the source object of the second hyperlink serving as a link source, the source object comprising information on the second hyperlink pointing to a target object;
obtaining a second average vector according to the second context vector and the second input vector;
adjusting at least one of the second input vector, the second context vector, or a second output vector corresponding to the target object; and
calculating a similarity between the second output vector and the second average vector according to a result of the adjusting;
outputting the second output vector as an output vector of the target object in response to the similarity between the second output vector and the second average vector being greater than or equal to the first target threshold.

4. The method of claim 1, wherein obtaining the first average vector according to the first context vector and the first input vector comprises:
obtaining a first context by removing the first hyperlink from a context comprising the first hyperlink in the first object; and
averaging the first input vector and an input vector corresponding to each word in a first context.

5. The method of claim 1, further comprising:
after outputting the first output vector as the output vector of the second object:
obtaining an input vector of each word in a third object;
determining a target parameter of the second object according to the input vector of each word of the third object and the output vector of the second object; and
determining, according to the target parameter, whether to allow the second object to be cited by the third object.

6. The method of claim 5, wherein determining whether to allow the second object to be cited by the third object comprises:
in response to a value of the target parameter being higher than a second target threshold, determining to allow the second object to be cited by the third object.

7. The method of claim 5, wherein determining whether to allow the second object to be cited by the third object comprises:
in response to the target parameter of the second object having a maximum value among target parameters of candidate objects, determining to allow the second object to be cited by the third object, the candidate objects comprising the second object.

8. The method of claim 7, further comprising:
in response to determining to allow the second object to be cited by the third object,
inserting a third hyperlink pointing to the second object at a target position of the third object, and
displaying, on the third object, prompt information for prompting the third hyperlink.

9. The method of claim 7, further comprising:
in response to determining to allow the second object to be cited by the third object,
inserting a third hyperlink pointing to the second object at a target position of the third object,
receiving indication information indicating an insert position of the third hyperlink in the third object, and
inserting the third hyperlink at the insert position in the third object according to the indication information.

10. The method of claim 8, wherein the inserting the third hyperlink pointing to the second object at the target position of the third object comprises:
searching the third object for a target word, wherein a similarity between an input vector corresponding to the target word and the output vector of the second object being higher than a third target threshold; and
inserting the third hyperlink at a position following the target word in the third object.

11. A hyperlink processing method, performed by a computing device, the method comprising:
obtaining a first input vector of a first object in response to the first object serving as a link source, the first input vector at least representing the first object and content describing a second object in the first object, and the first object comprising information on a first hyperlink pointing to the second object;
obtaining a first context of the first hyperlink;

generating a first average vector based on the first input vector and the first context;
obtaining a first output vector of the second object in response to the second object serving as a link target;
improving similarity between the first average vector and the first output vector by adjusting the first input vector or the first output vector based on a similarity optimization algorithm;
in response to the similarity between the first average vector and the first output vector being greater than or equal to the target threshold, outputting the first output vector as an output vector of the second object; and
storing the output vector of the second object in memory.

12. The method of claim 11, wherein
obtaining a first context of the first hyperlink comprises:
obtaining the first context of the first hyperlink by removing the first hyperlink from a context comprising the first hyperlink in the first object;
wherein generating the first average vector based on the first input vector and the first context comprises:
obtaining one or more word vectors corresponding to the first context of the first hyperlink, and
obtaining the first average vector according to the first input vector and the one or more word vectors corresponding to the first context; and
wherein improving the similarity between the first average vector and the first output vector comprises:
improving the similarity between the first average vector and the first output vector by adjusting at least one of the first input vector, the one or more word vectors corresponding to the first context, or the first output vector.

13. The method of claim 11, further comprising:
after obtaining the output vector of the second object, in order to output output vectors of a plurality of objects, repeatedly performing:
locating a hyperlink in the plurality of objects according to a predetermined rule;
using the located hyperlink as a second hyperlink;
obtaining a second input vector of a source object of the second hyperlink in response to the source object of the second hyperlink serving as a link source, the second input vector at least representing the source object and content describing a target object in the source object, the source object comprising information on the second hyperlink pointing to the target object;
obtaining a second output vector of the target object in response to the target object serving as a link target; and
obtaining an output vector of the target object according to at least the second input vector and the second output vector.

14. A hyperlink processing apparatus, comprising:
a memory operable to store program code; and
a processor operable to read the program code and configured to:
convert first context information of a first hyperlink in a first object into a first context vector;
obtain a first input vector of the first object in response to the first object serving as a link source, the first object comprising information on the first hyperlink pointing to a second object;
average the first context vector and the first input vector to obtain a first average vector;
improve similarity between the first average vector and a first output vector corresponding to the second object by executing a natural language processing model to adjust at least one of the first input vector, the first context vector, or the first output vector corresponding to the second object, the natural language processing model being trained based on an input vector and an output vector of an training object, the input vector differing from the output vector, the input vector representing information related to the training object serving as a link source, the output vector representing information related to the training object serving as a link target;
calculate a similarity between the first output vector and the first average vector according to a result of the adjustment;
output the first output vector as an output vector of the second object in response to the similarity between the first output vector and the first average vector being greater than or equal to a first target threshold; and
store the output vector of the second object in memory.

15. A hyperlink processing apparatus, comprising:
a memory operable to store program code; and
a processor operable to read the program code and configured to:
obtain a first input vector of a first object in response to the first object serving as a link source, the first input vector at least representing the first object and content describing a second object in the first object, and the first object comprising information on a first hyperlink pointing to the second object;
obtain a first context of the first hyperlink;
generate a first average vector based on the first input vector and the first context;
obtain a first output vector of the second object in response to the second object serving as a link target;
improve similarity between the first average vector and the first output vector by adjusting the first input vector or the first output vector based on a similarity optimization algorithm;
in response to the similarity between the first average vector and the first output vector being greater than or equal to the target threshold, outputting the first output vector as an output vector of the second object; and
store the output vector of the second object in memory.

16. The apparatus of claim 15, wherein the processor is further configured to:
obtain the first context of the first hyperlink by removing the first hyperlink from a context comprising the first hyperlink in the first object;
obtain one or more word vectors corresponding to the first context of the first hyperlink;
obtain the first average vector according to the first input vector and the one or more word vectors corresponding to the first context; and
improve the similarity between the first average vector and the first output vector by adjusting at least one of the first input vector, the one or more word vectors corresponding to the first context, or the first output vector.

17. A non-transitory machine-readable storage medium, having processor executable instructions stored thereon for causing a processor to:
convert first context information of a first hyperlink in a first object into a first context vector;
obtain a first input vector of the first object in response to the first object serving as a link source, the first object comprising information on the first hyperlink pointing to a second object;

average the first context vector and the first input vector to obtain a first average vector;
improve similarity between the first average vector and a first output vector corresponding to the second object by executing a natural language processing model to adjust at least one of the first input vector, the first context vector, or the first output vector corresponding to the second object, the natural language processing model being trained based on an input vector and an output vector of an training object, the input vector differing from the output vector, the input vector representing information related to the training object serving as a link source, the output vector representing information related to the training object serving as a link target;
calculate a similarity between the first output vector and the first average vector according to a result of the adjustment;
output the first output vector as an output vector of the second object in response to the similarity between the first output vector and the first average vector being greater than or equal to a first target threshold; and
store the output vector of the second object in memory.

18. A non-transitory machine-readable storage medium, having processor executable instructions stored thereon for causing a processor to:
obtain a first input vector of a first object in response to the first object serving as a link source, the first input vector at least representing the first object and content describing a second object in the first object, and the first object comprising information on a first hyperlink pointing to the second object;
obtain a first context of the first hyperlink;
generate a first average vector based on the first input vector and the first context;
obtain a first output vector of the second object in response to the second object serving as a link target;
improve similarity between the first average vector and the first output vector by adjusting the first input vector or the first output vector based on a similarity optimization algorithm;
in response to the similarity between the first average vector and the first output vector being greater than or equal to the target threshold, output the first output vector as an output vector of the second object; and
store the output vector of the second object in memory.

* * * * *